US012602518B2

(12) United States Patent
Chou et al.

(10) Patent No.: US 12,602,518 B2
(45) Date of Patent: Apr. 14, 2026

(54) INTEGRATING A DOCUMENT SIGNATURE SYSTEM WITH AN ACCOUNT MANAGEMENT SYSTEM

(71) Applicant: Dropbox, Inc., San Francisco, CA (US)

(72) Inventors: Esther Chou, Oakland, CA (US);
Angela Field, Alameda, CA (US);
Hameez Farrell, Toronto (CA);
Jennifer Young, Oakland, CA (US);
Mackenzie Cyr, Baltimore, MD (US);
Mara Saltzman, Oakland, CA (US);
Martin Todorov, San Francisco, CA
(US); Sulav Regmi, San Mateo, CA
(US); Timothy Finnerty, Yulee, FL
(US); Vishaka Varma Vimal, Mountain
View, CA (US); David Tang, San Jose,
CA (US)

(73) Assignee: Dropbox, Inc., San Francisco, CA (US)

( * ) Notice: Subject to any disclaimer, the term of this
patent is extended or adjusted under 35
U.S.C. 154(b) by 397 days.

(21) Appl. No.: 18/146,281

(22) Filed: Dec. 23, 2022

(65) Prior Publication Data

US 2024/0211638 A1 Jun. 27, 2024

(51) Int. Cl.
*G06F 21/64* (2013.01)
*G06F 40/186* (2020.01)

(52) U.S. Cl.
CPC ............ *G06F 21/64* (2013.01); *G06F 40/186*
(2020.01)

(58) Field of Classification Search
CPC . H04L 63/1433; H04L 63/20; H04L 63/1441;
H04L 63/102; H04L 63/08; H04L 63/10;
H04L 2209/38; H04L 63/1416; H04L
2209/46; H04L 2209/805; H04L 41/046;
H04L 41/0893; H04L 41/12; H04L
41/145; H04L 41/16; H04L 63/0853;
H04L 63/104; H04L 63/1425; H04L
63/205; H04L 63/0272; H04L 61/1511;
H04L 63/0236; H04L 67/563; G06F
2221/2101; G06F 21/552; G06F 21/554;
G06F 21/56; G06F 21/566; G06F
2221/034; G06F 21/57; G06F 21/577;
G06F 21/602; G06F 21/6209; G06F
21/6218; G06F 8/61; G06F 21/44; G06F
21/64; H04W 12/06; H04W 12/08; H04W
12/0027; H04W 12/00505; H04W
12/0609
USPC ............ 726/1, 2, 21, 36; 713/150, 163, 181;
380/255, 264, 276
See application file for complete search history.

(56) References Cited

U.S. PATENT DOCUMENTS 6,914,905 B1 * 7/2005 Yip ......................... H04L 61/35
370/395.53
7,664,879 B2 * 2/2010 Chan ....................... H04L 67/14
711/113
7,712,023 B1 * 5/2010 Bryan ................... G06F 40/174
705/31

(Continued)

*Primary Examiner* — Sharif E Ullah
(74) *Attorney, Agent, or Firm* — Keller Preece PLLC

(57) ABSTRACT

The present disclosure relates to systems, non-transitory
computer-readable media, and methods for integrating a
document signature system with an account management
system. In particular, in one or more embodiments, the
disclosed systems activate a digital document template for
integration with the account management system, receive
interaction data by a client device with a digital document,
and send the interaction data or the digital document to the
account management system.

20 Claims, 13 Drawing Sheets

(56) References Cited

U.S. PATENT DOCUMENTS

| | | | | |
|---|---|---|---|---|
| 7,725,934 | B2* | 5/2010 | Kumar | H04L 63/0245 |
| | | | | 713/188 |
| 7,962,582 | B2* | 6/2011 | Potti | H04L 67/02 |
| | | | | 370/400 |
| 8,010,085 | B2* | 8/2011 | Apte | G06F 21/577 |
| | | | | 709/227 |
| 8,245,141 | B1* | 8/2012 | Fuller | H04L 63/104 |
| | | | | 715/741 |
| 8,453,159 | B2* | 5/2013 | Appelbaum | G06F 16/24565 |
| | | | | 709/229 |
| 8,464,335 | B1* | 6/2013 | Sinha | G06F 21/51 |
| | | | | 713/153 |
| 8,656,154 | B1* | 2/2014 | Kailash | H04L 63/0807 |
| | | | | 713/168 |
| 8,769,268 | B2* | 7/2014 | Morozov | G06F 21/74 |
| | | | | 718/107 |
| 8,868,757 | B1* | 10/2014 | Liu | H04L 67/563 |
| | | | | 709/227 |
| 8,869,259 | B1* | 10/2014 | Udupa | H04L 63/20 |
| | | | | 726/10 |
| 8,869,262 | B2* | 10/2014 | Mullick | H04L 63/0876 |
| | | | | 709/227 |
| 8,955,091 | B2* | 2/2015 | Kailash | H04L 63/1425 |
| | | | | 726/11 |
| 9,065,800 | B2* | 6/2015 | Devarajan | G06F 21/56 |
| 9,100,424 | B1* | 8/2015 | Thomas | H04L 67/1095 |
| 9,124,586 | B2* | 9/2015 | Randriamasy | H04L 67/101 |
| 9,344,393 | B2* | 5/2016 | Boynton | H04L 63/0272 |
| 9,497,220 | B2* | 11/2016 | Cardamore | H04W 12/084 |
| 9,531,758 | B2* | 12/2016 | Devarajan | H04L 63/20 |
| 9,654,507 | B2* | 5/2017 | Gangadharappa | H04L 63/20 |
| 9,712,486 | B2* | 7/2017 | Johnson | H04W 4/70 |
| 9,882,767 | B1* | 1/2018 | Foxhoven | H04L 61/4552 |
| 9,935,955 | B2* | 4/2018 | Desai | H04L 67/02 |
| 10,009,391 | B1* | 6/2018 | Smith | H04L 67/02 |
| 10,044,719 | B2* | 8/2018 | Desai | H04L 63/20 |
| 10,091,169 | B2* | 10/2018 | Cohen | H04L 67/10 |
| 10,142,362 | B2* | 11/2018 | Weith | H04L 63/20 |
| 10,313,397 | B2* | 6/2019 | Komu | H04L 63/20 |
| 10,333,988 | B2* | 6/2019 | Porras | H04L 63/107 |
| 10,637,724 | B2* | 4/2020 | Johnson | H04W 12/062 |
| 11,316,902 | B2* | 4/2022 | Andrews | H04L 63/20 |
| 11,720,700 | B2* | 8/2023 | Kozlowski | G06F 21/44 |
| 2002/0091921 | A1* | 7/2002 | Kunzinger | H04L 63/0471 |
| | | | | 713/153 |
| 2003/0028616 | A1* | 2/2003 | Aoki | H04L 67/02 |
| | | | | 709/217 |
| 2005/0088977 | A1* | 4/2005 | Roch | H04L 47/10 |
| | | | | 370/254 |
| 2006/0004844 | A1* | 1/2006 | Rothschiller | G06F 40/143 |
| | | | | 707/999.102 |
| 2006/0069656 | A1* | 3/2006 | Horikiri | H04N 7/15 |
| | | | | 348/E7.083 |
| 2006/0268758 | A1* | 11/2006 | Serani | H04L 63/08 |
| | | | | 370/320 |
| 2011/0276875 | A1* | 11/2011 | McCabe | G06Q 10/10 |
| | | | | 715/255 |
| 2012/0255036 | A1* | 10/2012 | Kidder | H04L 63/08 |
| | | | | 726/29 |
| 2013/0318589 | A1* | 11/2013 | Ford | H04L 63/10 |
| | | | | 726/7 |
| 2014/0026206 | A1* | 1/2014 | Pazhyannur | H04W 12/06 |
| | | | | 726/12 |
| 2014/0164542 | A1* | 6/2014 | McCabe | G06Q 10/10 |
| | | | | 709/206 |
| 2014/0189483 | A1* | 7/2014 | Awan | H04L 63/08 |
| | | | | 715/212 |
| 2014/0245015 | A1* | 8/2014 | Velamoor | H04L 63/108 |
| | | | | 713/171 |
| 2014/0259093 | A1* | 9/2014 | Narayanaswamy | H04L 47/20 |
| | | | | 726/1 |
| 2014/0304836 | A1* | 10/2014 | Velamoor | G06F 21/6209 |
| | | | | 726/28 |
| 2015/0067464 | A1* | 3/2015 | McCabe | G06Q 10/10 |
| | | | | 715/224 |
| 2015/0074776 | A1* | 3/2015 | Gonser | G06F 21/64 |
| | | | | 726/6 |
| 2015/0213404 | A1* | 7/2015 | Follis | G06F 21/6209 |
| | | | | 705/317 |
| 2016/0019281 | A1* | 1/2016 | Hariharan | G06F 16/2452 |
| | | | | 707/783 |
| 2017/0054594 | A1* | 2/2017 | Decenzo | H04L 69/18 |
| 2017/0270320 | A1* | 9/2017 | Petrogiannis | G06F 21/30 |
| 2018/0024807 | A1* | 1/2018 | Martin | G06V 30/414 |
| | | | | 715/753 |
| 2018/0121667 | A1* | 5/2018 | Karpel | G06F 40/18 |
| 2018/0309795 | A1* | 10/2018 | Ithal | H04L 63/029 |
| 2018/0316723 | A1* | 11/2018 | Murgia | H04L 63/0428 |
| 2018/0359323 | A1* | 12/2018 | Madden | H04L 67/104 |
| 2020/0067984 | A1* | 2/2020 | Fausak | H04L 63/08 |
| 2020/0175080 | A1* | 6/2020 | Bethge | G06F 16/93 |
| 2020/0322338 | A1* | 10/2020 | Peterson | G06F 21/604 |
| 2020/0322357 | A1* | 10/2020 | Bryan | H04L 63/1408 |
| 2021/0281419 | A1* | 9/2021 | Steeves | G06F 16/2379 |
| 2022/0147948 | A1* | 5/2022 | Radhakrishnan | G06N 3/084 |
| 2023/0134651 | A1* | 5/2023 | Agbamu | G06V 40/172 |
| | | | | 705/325 |

* cited by examiner

700

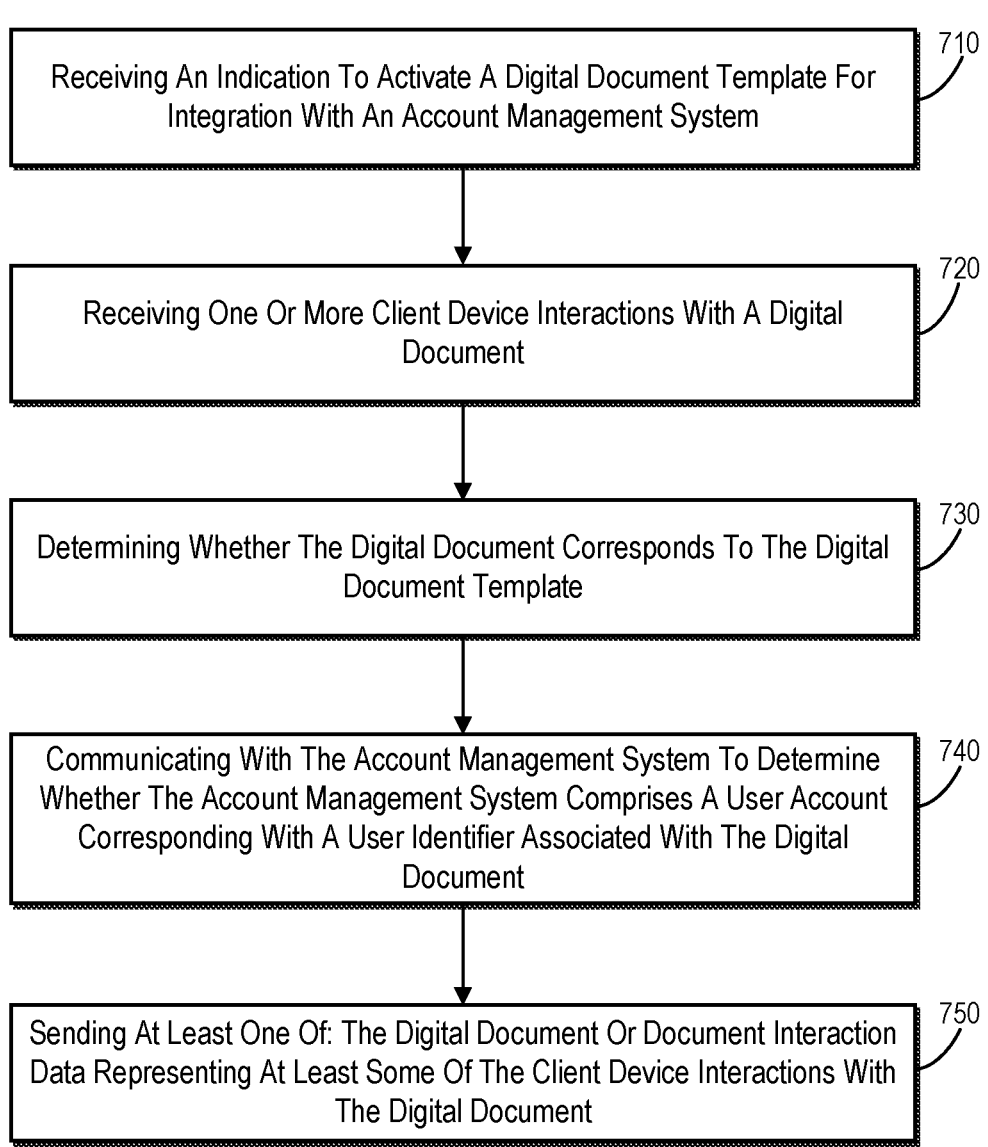

710

Receiving An Indication To Activate A Digital Document Template For Integration With An Account Management System

720

Receiving One Or More Client Device Interactions With A Digital Document

730

Determining Whether The Digital Document Corresponds To The Digital Document Template

740

Communicating With The Account Management System To Determine Whether The Account Management System Comprises A User Account Corresponding With A User Identifier Associated With The Digital Document

750

Sending At Least One Of: The Digital Document Or Document Interaction Data Representing At Least Some Of The Client Device Interactions With The Digital Document

INTEGRATING A DOCUMENT SIGNATURE SYSTEM WITH AN ACCOUNT MANAGEMENT SYSTEM

BACKGROUND

Recent years have seen developments in computer systems regarding distributing digital documents for signature. For example, some existing document signature systems provide tools for users to receive, open, view, and sign a digital document. By providing web-based or app-based tools to perform digital document signing processes, existing document signature systems often enable users to review and approve digital documents. Despite advances in digital document signature collection, existing digital document signature systems face a number of technical shortcomings, particularly with regard to the efficiency, flexibility, and accuracy of integrating digital document signature systems with account management systems.

To illustrate, many existing digital document signature systems are standalone systems that are designed to independently collect a digital signature or digital document. Despite being designed as a standalone system, however, existing digital document signature systems are often part of technical and software solution workflows that depends on other computer systems. The standalone nature of existing digital document signature systems, however, creates a variety of technical problems based on the inability for existing systems to integrate with other computer systems. Indeed, the standalone nature of existing digital document signature systems often causes inefficiencies and inflexibilities that result in increased requirements for digital communication bandwidth, memory storage space, and processing resources. For instance, because existing digital document signature systems are standalone systems, digital workflows are often pieced together using additional third-party systems to help manage signature statuses, communications based on signature statuses, and other decisions managed by a host of other computer systems. As a result, existing digital document signature systems cause the consumption of communication bandwidth, computer storage, and computer processing resources.

In addition, many existing digital document signature systems inflexibly result in undue human input and interaction with various graphical user interfaces across not only the existing digital document signature systems, but also other computer systems. For example, because of the standalone nature of existing digital document signature systems, a user often provides multiple and repeated steps interacting with multiple graphical user interfaces across multiple third-party systems to achieve a technical result. For example, existing digital document signature systems are unable to interface with third-party software solutions, such as an account management system and/or a tracking system to complete a single software workflow that achieves a technical solution of having up-to-date digital signature status data throughout the software workflow.

Further, the disadvantages and shortcomings discussed above also lead to inaccurate data. For example, and as discussed above, many software workflow solutions depend on accurate signature status data. However, because existing digital document signature solutions are standalone platforms, existing digital document signature systems lend to inaccurate records of document interaction data. For example, existing digital document signature systems require manual processes to overcome the technical shortcomings of the existing systems, thereby opening the door for substantial errors and inaccuracies in data.

These along with additional problems and issues exist with regard to existing document signature systems.

BRIEF SUMMARY

Embodiments of the present disclosure provide benefits and/or solve one or more of the foregoing or other problems in the art with systems, non-transitory computer-readable media, and methods for integrating a document signature system with an account management system. For example, the disclosed systems can activate digital document templates for integration with the account management system. The disclosed systems can utilize an API key to initiate communication between the document signature system and the account management system. The disclosed systems can also send an authentication request to a user client device to verify an email address corresponding with a user identifier. In some embodiments, the disclosed systems send a digital document based on a digital document template to the user client device. Further, the disclosed systems can track and record interactions by the user client device with the digital document and store the interactions as document interaction data. Also, the disclosed systems can send the digital document and/or the document interaction data to the account management system. In some embodiments, the disclosed systems can provide a preview of the digital document within a graphical user interface of the account management system being accessed by an administrator client device.

By way of example, the disclosed systems can receive an indication to activate a digital document template for integration with an account management system and can receive one or more client device interactions with a digital document. The disclosed systems can determine a signature status of the digital document based on the client device interactions. In some embodiments, for instance, the disclosed systems can communicate with the account management system to determine whether the account management system includes a user account corresponding with a user identifier associated with the digital document. Accordingly, the disclosed systems can send to the account management system at least one of the digital document or the document interaction data representing at least some of the client device interactions with the digital document.

Additionally, the disclosed systems can provide an integrated solution for communicating document interaction data to the account management system. For example, the disclosed systems directly share document interaction data with the account management system, thereby eliminating a need for a separate application for tracking client device interactions with the digital document. Furthermore, the disclosed systems reduce the number of steps required for a human user to interact with user interfaces associated with the account management system. Also, the disclosed systems eliminate significant manual data entry processes, thereby enhancing the accuracy of the stored document interaction data.

The following description sets forth additional features and advantages of one or more embodiments of the disclosed methods, non-transitory computer-readable media, and systems. In some cases, such features and advantages are evident to a skilled artisan having the benefit of this disclosure, or may be learned by the practice of the disclosed embodiments.

BRIEF DESCRIPTION OF THE DRAWINGS

The detailed description provides one or more embodiments with additional specificity and detail through the use of the accompanying drawings, as briefly described below.

FIG. 7 illustrates a flowchart of a series of acts for integrating a document signature system with an account management system in accordance with one or more embodiments.

DETAILED DESCRIPTION

Figure 1:
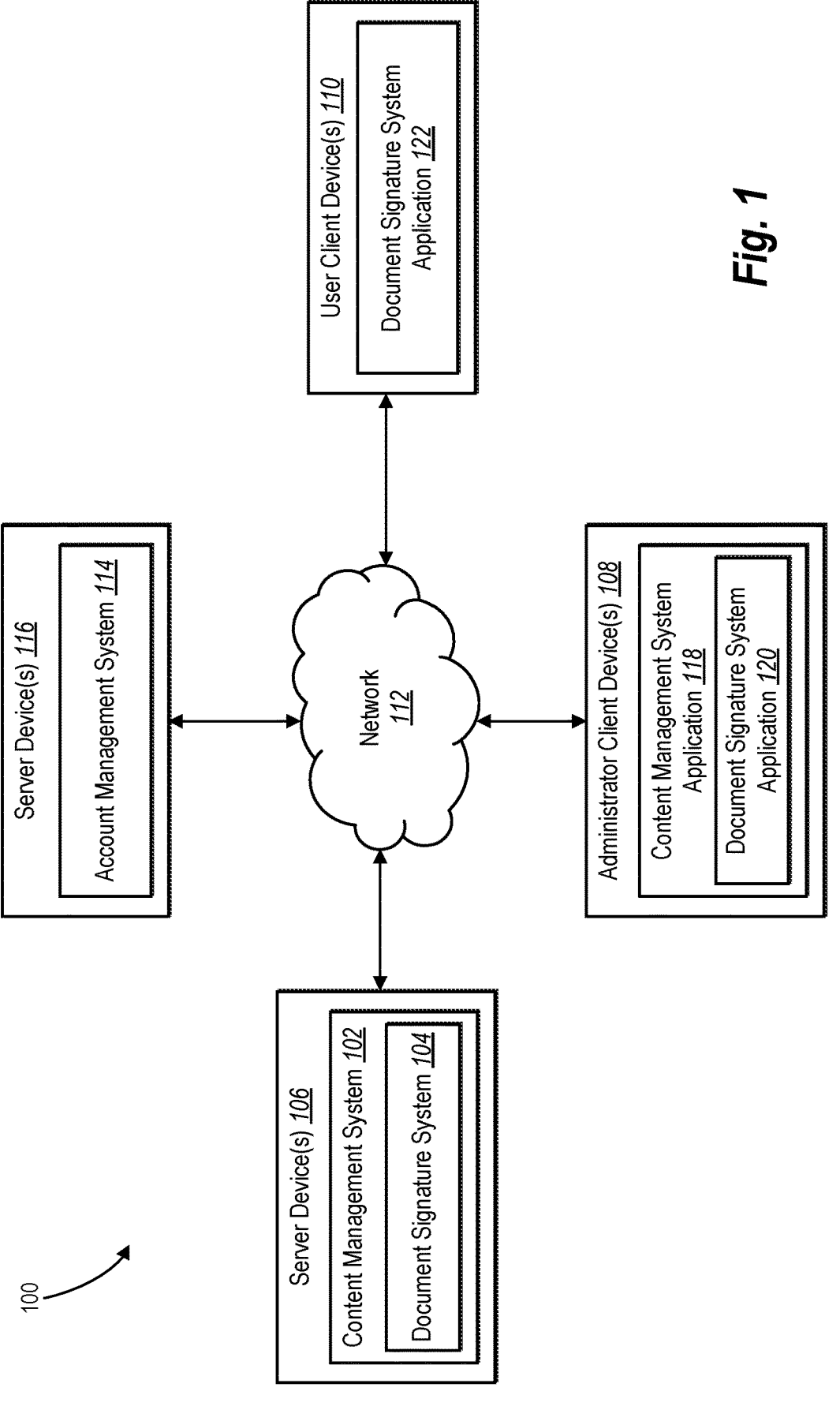
FIG. 1 illustrates a diagram of an environment in which a document signature system can operate in accordance with one or more embodiments.

This disclosure describes one or more embodiments of a digital document signature system (or simply, document signature system) that activates an integration with an account management system to collect and share document interaction data with the account management system. For example, in some embodiments, the document signature system distributes digital documents (e.g., fillable forms such as non-disclosure agreements), stores copies of the digital documents (e.g., after the digital document has been signed), and collects document interaction data from a client device. In some embodiments, the document signature system utilizes a harvest API to extract information indicating that a document is signed and to share that information with the account management system. In some other embodiments, the document signature system utilizes an assessment API to indicate that an assessment is passed (e.g., the digital document is signed) and to share the digital document with the account management system.

To illustrate, in some embodiments, the document signature system activates a digital document template for integration with the account management system. The document signature system receives one or more client device interactions with the digital document. Based on receiving the client device interactions, the document signature system determines whether the digital document is signed. In some cases, the document signature system communicates with the account management system to determine whether the account management system includes a user account corresponding with a user identifier associated with the digital document. Accordingly, the document signature system can send the digital document and/or the document interaction data to the account management system.

Utilizing the harvest API, the document signature system can integrate an API through the document signature system to activate template links for the account management system (e.g., via an API key). Upon activation, the document signature system enables an administrator account (e.g., associated with a recruiter or talent coordinator) to create and/or select form templates to activate and link. Upon activation, the document signature system tracks signature progress and, once a signature is detected (and an email address of the signor verified), the document signature system uploads the signed document (or provides an indication that the document is signed) to an application object associated with an account profile of the recipient/signor of the document (where the account profile is accessible by the talent coordinator via the account management system).

The document signature system provides many advantages and benefits over existing systems and methods. For example, by integrating with the account management system, the document signature system improves efficiency over existing systems. Specifically, the document signature system eliminates a need for a separate system or application (e.g., a spreadsheet application) for tracking client device interactions with the digital document. Thus, the document signature system reduces bandwidth, memory storage space, and processing resources that would otherwise be required to support the separate system or application. In this way, the document signature system solves a technical problem by providing for a technical integration between the document signature system that increases computing efficiency of computing technology directed to document signature workflows and account management systems.

Additionally, the document signature system provides increased flexibility relative to existing systems by eliminating interaction steps with graphical user interfaces. For instance, because the document signature system allows for integration with the account management system, the document signature system communicates document interaction data with the account management system, which results in simplification of the user interface required to manage the document interaction process. In this way, an account manager (e.g., the talent coordinator) can verify client device interactions with fewer clicks, fewer steps, and fewer interfaces as compared with existing systems.

Furthermore, the document signature system enhances the accuracy of computing systems over existing systems. For example, by eliminating much or all of the manual process of data entry required by existing systems, the document signature system prevents or reduces the incidence of inaccurate data. For instance, the document signature system eliminates clerical errors due to existing manual workflow solutions with respect to client device interaction data by easily creating, providing, and managing an interaction interface between the document signature system and the account management system. Moreover, the document signature system avoids omissions of data and/or data updates caused by the technical shortcomings of previous systems. Thus, the document signature system offers much more accurate methods and systems to track client device interactions with digital documents.

As illustrated by the foregoing discussion, the present disclosure utilizes a variety of terms to describe features and advantages of the document signature system. Additional detail is now provided regarding the meaning of such terms. For example, as used herein, the term "document signature system" refers to a system for distributing and collecting digital documents, and managing, tracking, and detecting changes to the digital documents. In particular, the term "document signature system" can include a system for managing changes to digital documents, such as fillable forms. To illustrate, a document signature system can include a system for collecting signatures for non-disclosure agreements and/or other forms. In one or more embodiments, the document signature system is a cloud-based document signature system meaning that the services and functionality of the document signature system are provided via computing resources that involve the delivery of hosted services via the internet.

As used herein, the term "digital document" or "document" refers to a digital file that is readable, writable, shareable, downloadable, and/or signable via a document signature system application or other application integrated with the document signature system. In particular, the term "digital document" can include fillable forms. To illustrate, a digital document can include a nondisclosure agreement, an inventor declaration, a property assignment agreement, an employment agreement, an arbitration agreement, a personal identifying information form, an application for a loan, or another form application or agreement.

As used herein, the term "digital document template" refers to a template for creating a copy of a digital document for distribution to a user device. In particular, the term "digital document template" can include a base form for modification by the user device. To illustrate, a digital document template can include a template for a non-disclosure agreement ("NDA"), including a geographic-region-specific non-disclosure agreement. A digital document template can further include a template for an inventor declaration, a property assignment agreement, an employment agreement, an arbitration agreement, a personal identifying information form, an application for a loan, or another form application or agreement.

As used herein, the term "account management system" refers to a system for tracking, storing, and/or locating information associated with one or more user accounts. In particular, the term "account management system" can include a system with user accounts for employment candidates, inventors, loan applicants, customers, subscribers, employees, and/or other users modifying and submitting fillable forms. As used herein, the term "user account" refers to an account or profile associated with a user of a document signature system application or other application. In particular, the term "user account" can include a candidate profile with information relating to a candidate for employment. While this disclosure discusses various examples of a user account in terms of an account management system that manages candidates for employment, the systems disclosed herein are not limited to this example and can apply to any computer system that manages user accounts for any purposes. As used herein, the term "user identifier" refers to data comprising identifying information about a user or user account. To illustrate, a user identifier can include a name, email address, social media handle, application number, or other unique identifying number.

As used herein, the term "client device interaction" refers to an interaction by a client device with a digital document. In particular, the term "client device interaction" can include events and/or actions by a client device through a document signature system application. To illustrate, a client device interaction can include opening, viewing, reading, scrolling, editing, commenting, signing, sending, or closing a digital document.

As used herein, the term "document interaction data" (or "client device interaction data") refers to data relating to interaction by a client device with a document. In particular, the term "document interaction data" can include information about actions taken by a user relating to a digital document. To illustrate, document interaction data can include records of a client device opening, viewing, scrolling, signing, refusing to sign, and/or closing a digital document.

As used herein, the term "signature profile" refers to an indication of a signature by a user device. To illustrate, a signature profile can include an image, passcode, digital key, or other evidence of a user agreeing to a document or a portion of a document. As used herein, the term "status of a signature profile" refers to an indication whether a document or portion of a document has been signed by a user. To illustrate, a status of a signature profile can include a message that a document has been signed (or unsigned) by the user client device.

As used herein, the term "distributed document" refers to a document that requires or requests multiple actions by a user. In particular, the term "distributed document" can include a document that requests multiple signatures, initials, or fillable information. To illustrate, a distributed document can include a contract (e.g., a nondisclosure agreement) that requires initials on various sections throughout the document and a signature at the end of the document.

As used herein, the term "communication event" refers to a meeting, interview, or other event utilizing telephone, videoconference, or other teleconference technology. To illustrate, a communication event can include a videoconference event that is an employment interview via videoconference. As used herein, the term "event prevention communication" refers to a message or instruction to forego a scheduled event, such as a communication event. In particular, the term "event prevention communication" can include a transmission denying authorization to conduct an event. To illustrate, an event prevention communication can include a request not to conduct a videoconference interview or an executable instruction to block a videoconference application from allowing or facilitating a videoconference event. Moreover, an event prevention communication can include an instruction to pause or prevent progression of a workflow associated with a user account. For example, an event prevention communication can prevent a user account from continuing through a hiring workflow.

Turning now to the figures, FIG. 1 illustrates a block diagram of a system environment 100 in which a content management system 102 and a document signature system 104 operate in accordance with one or more embodiments. As illustrated in FIG. 1, the system environment 100 includes server device(s) 106, administrator client device(s) 108, user client device(s) 110, and server device(s) 116, where the server device(s) 106 include the document signature system 104, and where the server device(s) 116 include an account management system 114. As shown in FIG. 1, in some embodiments, the content management system 102 comprises the document signature system 104. In some embodiments, the document signature system 104 is a standalone system on the server device(s) 106, without the content management system 102. Each of the administrator client device(s) 108 and the user client device(s) 110 are associated with a type of user. The administrator client device(s) 108 may be associated with an administrator, such as a talent coordinator, that uses the administrator client device(s) 108 to submit document signature request to another user. The user client device(s) 110 may be associated with a user, such as a candidate, that uses the user client device(s) 110 to review and/or sign documents. In other words, in some embodiments, the user client device(s) 110 is a candidate client device.

In some embodiments, the administrator client device(s) 108 and the user client device(s) 110 communicate with server device(s) 106 and/or server device(s) 116 over a network 112. As described below, the server device(s) 106 and the server device(s) 116 can enable the various functions, features, processes, methods, and systems described herein using, for example, the document signature system 104 and/or the account management system 114. The document signature system 104 and/or the account management system 114 comprise computer executable instructions that, when executed by a processor of the server device(s) 106 or the server device(s) 116, perform certain actions described below with reference to FIGS. 2-7. Additionally, or alternatively, in some embodiments, the server device(s) 106 and the server device(s) 116 coordinate with one or both of the administrator client device(s) 108 and the user client device(s) 110 to perform or provide the various functions, features, processes, methods, and systems described in more detail below. Although FIG. 1 illustrates a particular arrangement of the server device(s) 106, the server device(s) 116, the administrator client device(s) 108, the user client device(s) 110, and the network 112, various additional arrangements are possible. For example, the server device(s) 106 and the content management system 102 may directly communicate with the administrator client device(s) 108, bypassing the network 112. As another example, the document signature system 104 and the account management system 114 may be collocated on the server device(s) 106, with or without the content management system 102.

Generally, the administrator client device(s) 108 and the user client device(s) 110 may be any one or more of various types of client devices. For example, the administrator client device(s) 108 and the user client device(s) 110 may be mobile devices (e.g., a smart phone, a tablet), laptops, desktops, or any other type of computing devices, such as those described below with reference to FIG. 8. Additionally, the server device(s) 106 and/or the server device(s) 116 may include one or more computing devices, including those explained below with reference to FIG. 8. The server device(s) 106, the server device(s) 116, the administrator client device(s) 108, and the user client device(s) 110 may communicate using any communication platforms and technologies suitable for transporting data and/or communication signals, including the examples described below with reference to FIG. 9.

To access the functionalities of the document signature system 104, in certain embodiments, an administrator interacts with a document signature system application 120 on the administrator client device(s) 108. In some embodiments, the document signature system application 120 may operate on or in conjunction with a content management system application 118. Similarly, in some implementations, candidates or other users interact with a document signature system application 122 on the user client device(s) 110. In some embodiments, one or both of the document signature system application 120 and the document signature system application 122 comprise web browsers, applets, or other software applications (e.g., native applications or web applications) available to the administrator client device(s) 108 or the user client device(s) 110, respectively. Additionally, in some instances, the content management system 102 and/or the document signature system 104 provides data packets including instructions that, when executed by the administrator client device(s) 108 or the user client device(s) 110, create or otherwise integrate the document signature system application 120 or the document signature system application 122 within an application or webpage for the administrator client device(s) 108 or the user client device(s) 110, respectively. For example, in response to a document signature request from the administrator client device(s) 108, the user client device(s) 110 can use the document signature system application 122 to sign a document. The user client device(s) 110 can send the signed document and/or document interaction data to the administrator client device(s) 108 (e.g., via the document signature system 104).

As an initial overview, the server device(s) 106 provides the administrator client device(s) 108 access to the content management system 102 and the document signature system 104 by way of the network 112. In one or more embodiments, by accessing the document signature system 104, the server device(s) 106 provides one or more digital document templates to the administrator client device(s) 108 to enable the administrator client device(s) 108 to select some or all of the one or more digital document templates for distribution of one or more corresponding digital documents to the user client device(s) 110 (e.g., to open, view, scroll, sign, complete, and/or submit the one or more digital documents). In one or more embodiments, by accessing the account management system 114, the server device(s) 116 enable the administrator client device(s) 108 to access (e.g., view, edit, send documents to) one or more user accounts corresponding with user identifiers (e.g., candidate profiles).

In some cases, the administrator client device(s) 108 launches the content management system application 118 and/or the document signature system application 120 to facilitate interaction with the document signature system 104, the content management system 102, and/or the account management system 114. The content management system application 118 or the document signature system application 120 may coordinate communications between the administrator client device(s) 108 and the server device(s) 106 and/or the server device(s) 116. For instance, the document signature system application 120 can activate digital document templates for integration with the account management system 114, receive client device interactions with a digital document, and send the digital document and/or document interaction data to the account management system 114.

As discussed above, the document signature system 104 can integrate with the account management system 114, provide a digital document to the user client device(s) 110, receive client device interactions with the digital document, and send the digital document to the account management system 114. For instance, FIG. 2 illustrates the document signature system 104 performing document signature integration acts in accordance with one or more embodiments.

Figure 2:
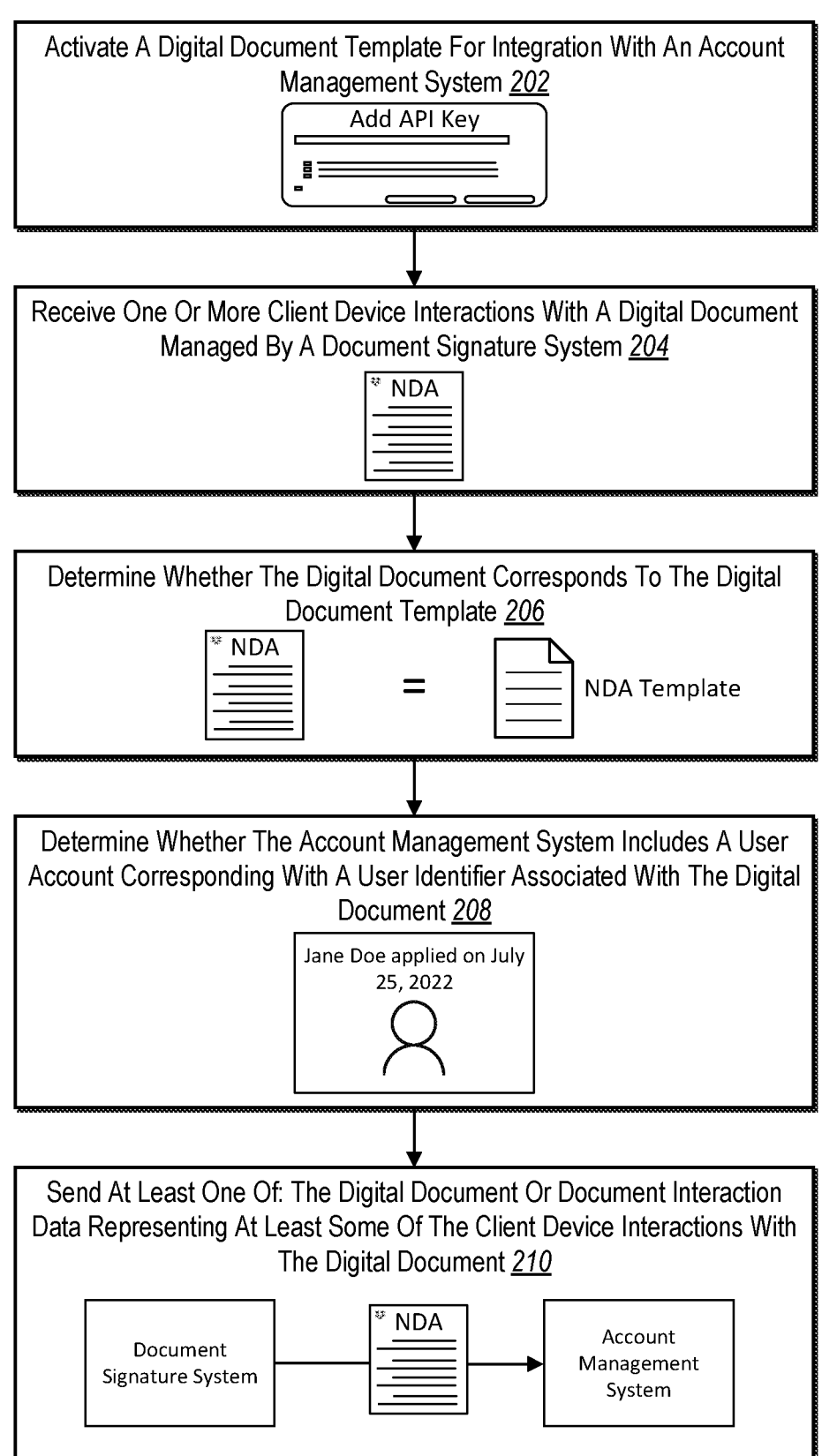
FIG. 2 illustrates an overview of the document signature system integrating with an account management system and sending a digital document and/or document interaction data to the account management system in accordance with one or more embodiments.

Specifically, FIG. 2 shows the document signature system 104 activating 202 a digital document template for integration with the account management system 114. For example, the document signature system 104 receives, from the administrator client device(s) 108, an indication to activate a digital document template. In some embodiments, the document signature system 104 provides to the administrator client device(s) 108 an option to select one or more digital document templates. The document signature system 104 can store a variety of digital document templates for a variety of purposes. For instance, the document signature system 104 can store different digital document templates for several different uses and/or various geographic applicability. For example, the document signature system 104 stores a first digital document template for a non-disclosure agreement specific to North America and a second digital document template for a non-disclosure agreement specific to Australia. As another example, the document signature system 104 stores a third digital document template for an employment agreement, a fourth digital document template for an inventor declaration, and a fifth digital document template for a property assignment agreement.

Upon receipt of a selection by the administrator client device(s) 108 of one or more digital document templates, the document signature system 104 can request an application programming interface key ("API key") from the administrator client device(s) 108. In some embodiments, the document signature system 104 utilizes the API key to integrate the document signature system 104 with the account management system 114. For example, the document signature system 104 transmits information corresponding with the API key to the account management system 114 for verification that the document signature system 104 is authorized to activate integration with the account management system 114. In some embodiments, the document signature system 104 activates integration with the account management system 114 without receiving or sending an API key.

In some embodiments, the document signature system 104 provides one or more digital documents to the user client device(s) 110. For example, based on the selection of the one or more digital document templates by the administrator client device(s) 108, the document signature system 104 generates a digital document corresponding to each of the one or more digital document templates. For instance, the document signature system 104 generates one or more copies of the one or more digital document templates and sends the one or more copies of the one or more digital document templates to the user client device(s) 110.

As illustrated in FIG. 2, in some embodiments, the document signature system 104 receives 204 one or more client device interactions with the digital document. For example, after the document signature system 104 sends the one or more digital documents to the user client device(s) 110, the user client device(s) 110 opens the one or more digital documents, scrolls through them, and signs them. The document signature system 104 receives document interaction data indicating that the user client device(s) 110 opened, scrolled through, and signed the document(s).

In some implementations, the document signature system 104 receives copies of the signed document(s). As further illustrated in FIG. 2, the document signature system 104 can determine 206 whether the digital document(s) corresponds to the digital document template(s). For example, the document signature system 104 verifies that the copy of the signed document is, with the exception of a signature and date of signature, identical to the digital document template. In this manner, the document signature system 104 determines whether the digital document has been altered after the document signature system 104 sent the digital document.

As further depicted in FIG. 2, in some embodiments, the document signature system 104 determines 208 whether the account management system 114 includes a user account corresponding with a user identifier associated with the digital document. For instance, the document signature system 104 finds a user identifier associated with the digital document (e.g., a name or an email of a candidate who signed the document), and queries the account management system 114 to determine whether the account management system 114 has a matching user profile for the user identifier. In some embodiments, the document signature system 104 determines whether the account management system 114 includes multiple user accounts corresponding with multiple user identifiers associated with a digital document. For example, the document signature system 104 identifies a first user account and a second user account selected to sign the digital document, and queries the account management system 114 to determine whether the account management system 114 has matching user profiles for each user identifier.

As also illustrated in FIG. 2, in some implementations, the document signature system 104 sends 210 at least one of the digital document or document interaction data. For instance, upon determining that the account management system 114 has a user account corresponding with the user identifier associated with the digital document, the document signature system 104 sends the digital document to the account management system 114. The account management system 114 can then upload the digital document to the user account. In some embodiments, the document signature system 104 sends document interaction data to the account management system 114. For example, the document signature system 104 sends data indicating that the user client device(s) 110 opened and signed the digital document.

As discussed above, the document signature system 104 can integrate with the account management system 114 and interact with the administrator client device(s) 108 and the user client device(s) 110 to perform acts of the embodiments disclosed herein. For instance, FIGS. 3A-3C illustrate a workflow of the document signature system 104 performing such acts in accordance with some embodiments.

Figure 3A:
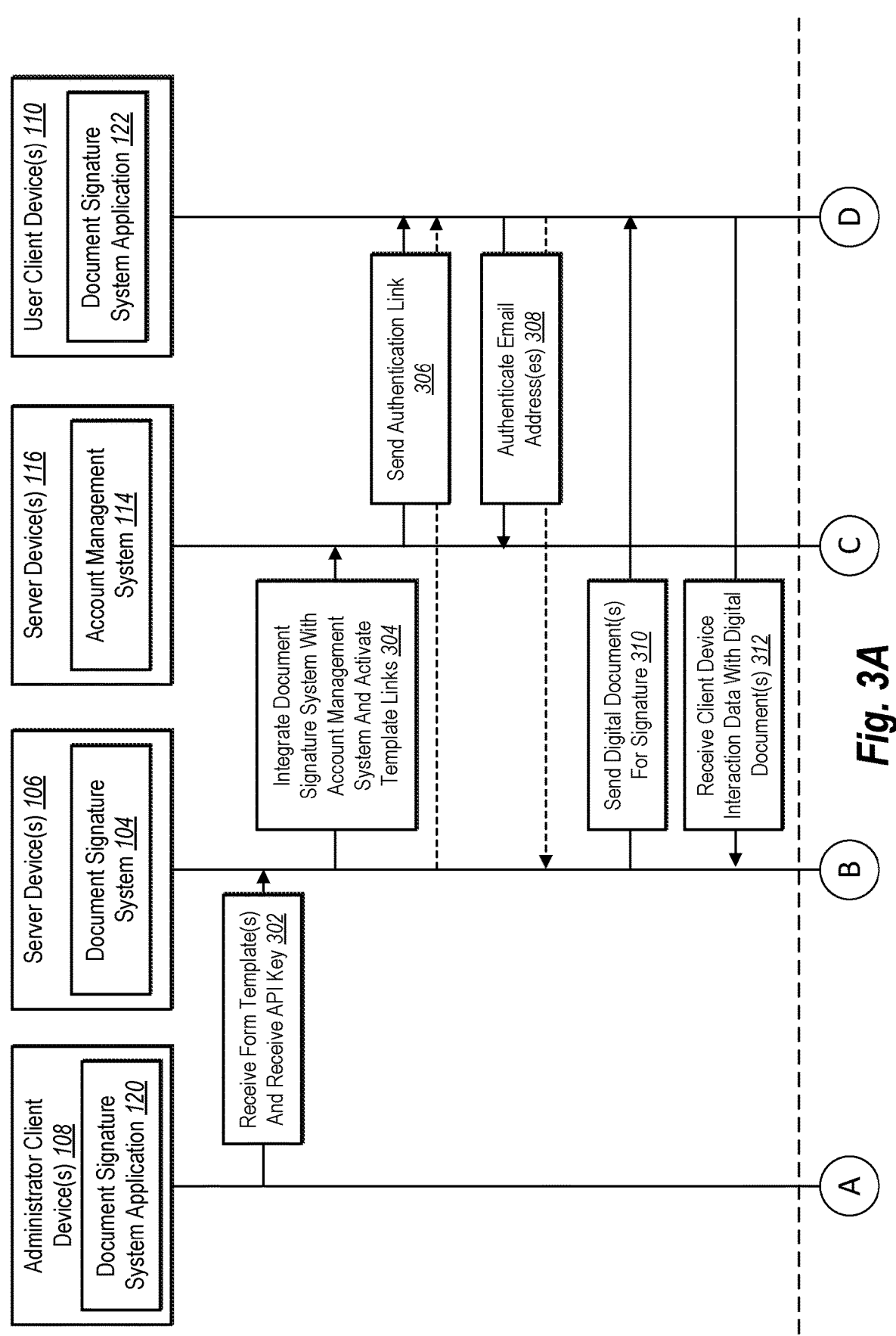
FIGS. 3A-3C illustrate schematic workflow diagrams of a document signature system integrated with an account management system in accordance with one or more embodiments.
Figure 3B:
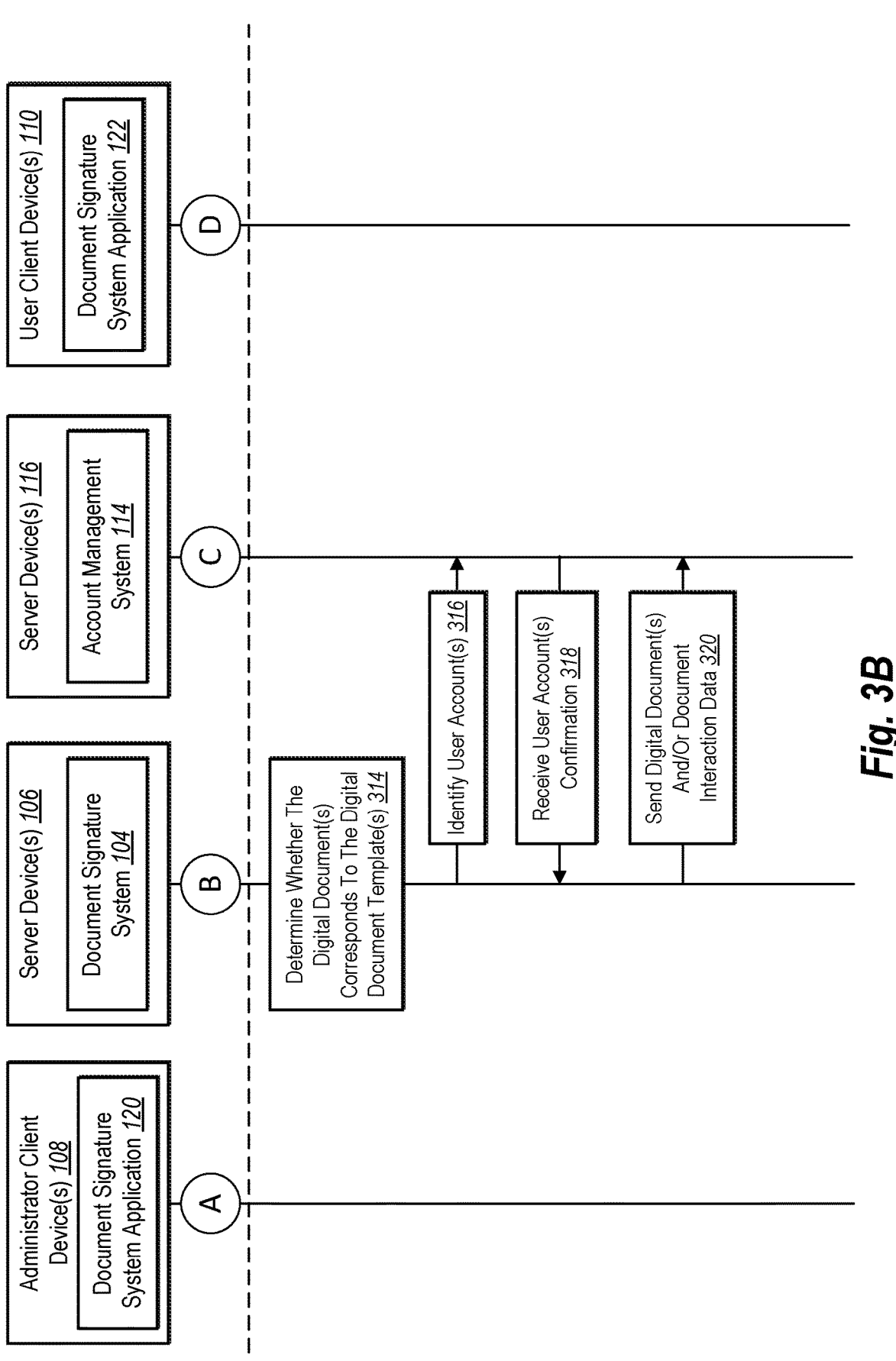
Figure 3C:
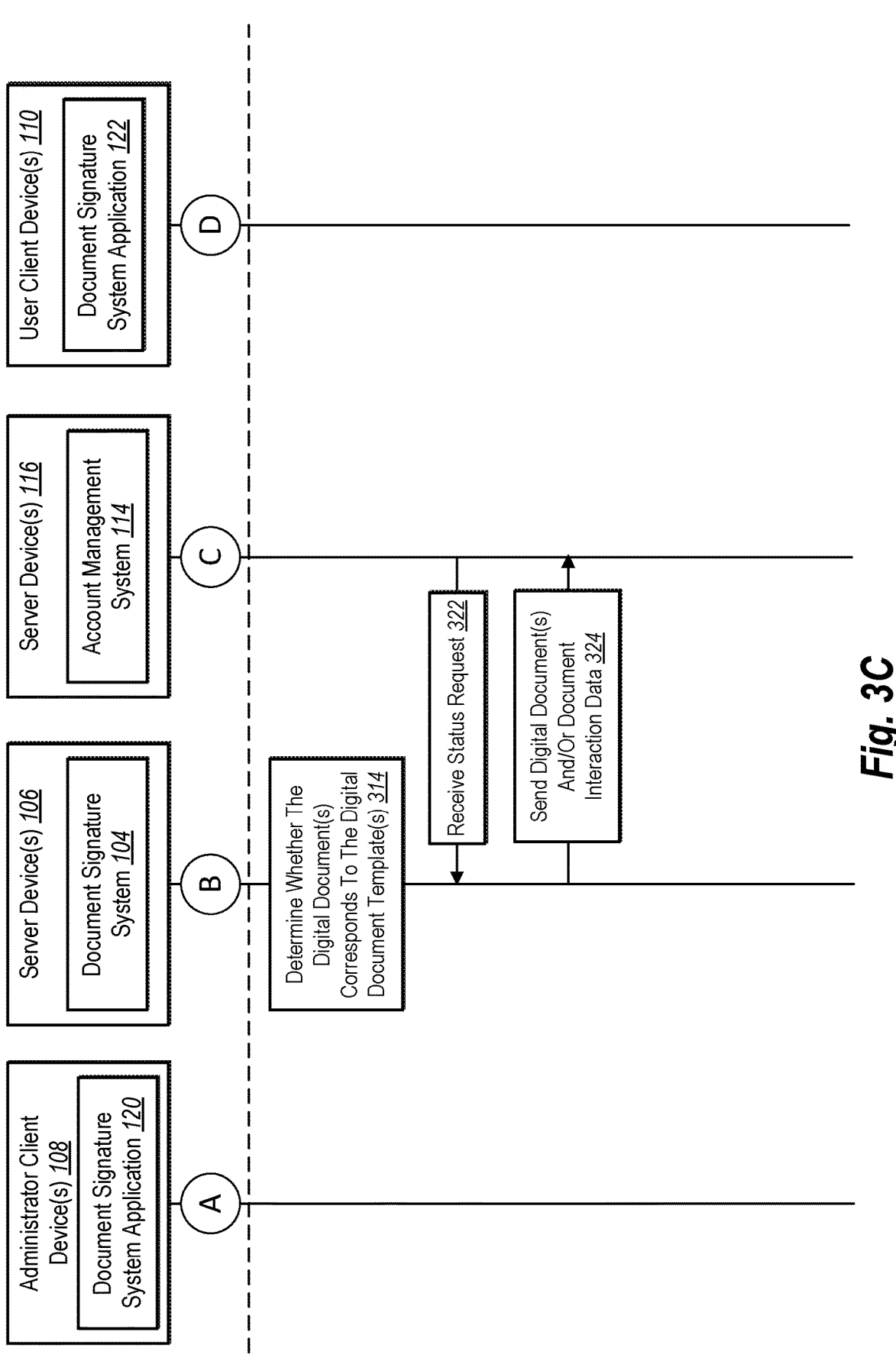

Specifically, FIG. 3A shows the document signature system 104 receiving 302 form template(s) and an API key. For example, the document signature system 104 receives a selection by the administrator client device(s) 108 of one or more document templates for integration with the account management system 114. Additionally, the document signature system 104 receives from the administrator client device(s) 108 an API key indicating authorization to integrate with the account management system 114. In some embodiments, the document signature system 104 receives the selection of form templates and the API key only once from any particular administrator client device 108. In this way, the document signature system 104 can indefinitely integrate an instance of the document signature system application 120 on the administrator client device 108 with the account management system 114, thereby alleviating any need for recurring system activations. However, in some embodiments, the document signature system 104 receives submissions of form template(s) and API keys from the administrator client device 108 on a recurring basis, such as each time the document signature system 104 authenticates the user client device(s) 110 and sends digital documents to the user client device(s) 110.

Continuing through FIG. 3A, in some embodiments, the document signature system 104 integrates 304 the document signature system 104 with the account management system 114 and activates the template links. For instance, the document signature system 104 transmits information associated with the API key to the account management system 114 to authenticate permission to access the services of the account management system 114. The document signature system 104 also locates the digital document templates selected by the administrator client device(s) 108 and generates digital documents based on the digital document templates.

As further depicted in FIG. 3A, in some embodiments, the account management system 114 sends 306 an authentication link to the user client device(s) 110. Alternatively, in some embodiments, the document signature system 104 sends 306 the authentication link to the user client device(s) 110. For example, the document signature system 104 receives a user identifier from the administrator client device(s) 108 indicating an intended signor of a document. The document signature system 104 sends an authentication link to a user client device associated with the user identifier.

In some embodiments, the account management system 114 authenticates 308 an email address associated with the user identifier. Alternatively, in some embodiments, the document signature system 104 authenticates 308 the email address associated with the user identifier. For example, the document signature system 104 receives a communication from the user client device associated with the user identifier, indicating that the user client device has received and activated the authentication link. Thus, the document signature system 104 validates the email address associated with the user identifier. In embodiments in which the account management system 114 authenticates the email address associated with the user identifier, the document signature system 104 can receive verification from the account management system 114 that the email address has been validated.

As further illustrated in FIG. 3A, in some implementations, the document signature system 104 sends 310 the digital document(s) to the user client device(s) 110 for signature. For instance, the document signature system 104 sends a file containing a copy of a digital document to the user client device(s) 110. In some embodiments, the document signature system 104 sends a link or links to the user client device(s) 110 by which the user client device(s) 110 can access a cloud-based copy of the digital document.

The user client device(s) 110 can access and interact with the digital document. For example, the user client device(s) 110 can view (e.g., preview) the digital document, open the digital document, read (e.g., scroll through) the digital document, sign the digital document, and/or close the digital document. In some embodiments, the user client device(s) 110 can edit the digital document, add suggested revisions to the digital document, and/or contest some or all of the digital document. The document signature system 104 can receive 312 and record these and other interactions by the user client device(s) 110 with the digital document as client device interaction data.

In some implementations, the document signature system 104 determines whether the digital document is signed. For instance, the document signature system 104 reads the client device interaction data received from the account management system 114 to determine that the user client device(s) 110 has signed (or not) the digital document.

In some embodiments, the document signature system 104 sends a notification comprising at least some of the client device interaction data. For example, the document signature system 104 sends a notification to the account management system 114 indicating that the digital document is unsigned.

In some embodiments, the document signature system 104 indicates to the account management system 114 a signature completion status of a distributed document. For example, the document signature system 104 identifies that the user client device(s) 110 has signed a first portion of the digital document, but has not signed a second portion of the digital document. The document signature system 104 can notify the account management system 114 that some portions (including which portions) are signed, and some portions are unsigned.

In some implementations, the document signature system 104 identifies multiple user accounts selected to sign a digital document. The document signature system 104 can track which user accounts have signed the digital document and indicate a signature completion status to the account management system 114. For instance, the document signature system 104 generates a unique link for each user account selected to sign the digital document. Each user account can follow its unique link to authenticate an email address associated with that user account. Then, the document signature system 104 can send the digital document the each of the multiple user accounts. The document signature system 104 can which user accounts have interacted with the digital document, and in what ways. For example, the document signature system 104 identifies that a first user account has signed the digital document, while a second user account has not signed the digital document.

The document signature system 104 can communicate with the account management system 114 to notify the account management system 114 which user accounts have signed the digital document. In some embodiments, the document signature system 104 communicates with the account management system 114 to report a signature completion status for the digital document, such as a percentage complete or a number of total user accounts that have signed the document. In some implementations, the document signature system 104 generates a report of recent (e.g., past month) document signature requests sent to user profiles, including which requests were fulfilled with a completed signature and/or which documents were viewed but not signed.

In some embodiments, the document signature system 104 determines that the digital document is unsigned (whether by a single user account or by at least one user account out of multiple user accounts) and sends an event prevention communication to the account management system 114 indicating that a videoconference event should be blocked. For example, a user account associated with an employment candidate has not signed a non-disclosure agreement. The document signature system 104 detects the lack of a signature for the non-disclosure agreement and transmits a notification that a videoconference interview should not proceed. In some embodiments, the document signature system 104 controls a videoconferencing application to prevent the videoconferencing application from initiating a videoconference event between the user account and an administrator account.

In some embodiments, the document signature system 104 maintains a signature completion status for a predetermined period of time (e.g., six months). After the predetermined period of time has elapsed, the document signature system 104 can update the signature completion status (e.g., to unsigned) and require a new signature before a videoconference event.

In some implementations, the document signature system 104 determines that the digital document is unsigned and sends a reminder notification to the user client device(s) 110 communicating that the digital document needs to be signed. For instance, a user associated with the user client device(s) 110 may have a scheduled upcoming videoconference interview. The document signature system 104 can send an automated reminder to the user client device(s) 110 within a predetermined amount of time before the scheduled video-conference interview.

The workflow of the document signature system 104 performing acts of some of the disclosed embodiments, as illustrated in FIGS. 3A-3C, continues from FIG. 3A to FIG. 3B, and alternatively from FIG. 3A to FIG. 3C. Thus, some of the acts illustrated in FIG. 3B are performed by some embodiments, whereas some of the acts illustrated in FIG. 3C are performed by some alternative embodiments. The workflow acts of the administrator client device(s) 108, the server device(s) 106, the server device(s) 116, and the user client device(s) 110 continue from FIG. 3A to FIG. 3B, and alternatively from FIG. 3A to FIG. 3C, using the reference balloons labeled A, B, C, and D, respectively.

As illustrated in FIG. 3B, in some implementations, the document signature system 104 determines 314 whether the digital document corresponds to the digital document template. For example, the document signature system 104 accesses the digital document after the user client device(s) 110 has interacted with the digital document to determine changes made by the user client device(s) 110 to the digital document. For instance, the document signature system 104 reads the digital document to verify that the digital document contains the same content as the digital document template, with the exception of authorized user interaction content, such as signatures and signature dates.

Continuing through FIG. 3B, in some embodiments, the document signature system 104 identifies 316 a user account(s) with the account management system 114. To illustrate, the document signature system 104 queries the account management system 114 whether the account management system 114 includes a user account corresponding to the user identifier associated with the digital document. For example, the document signature system 104 sends user identifier information (e.g., candidate name, application number, email address) to the account management system 114 with a query whether the account management system 114 has an account profile with matching identifying information for the user identifier.

In some embodiments, the document signature system 104 receives 318 a user account confirmation from the account management system 114. For instance, after the account management system 114 receives the query from the document signature system 104 whether the account management system 114 has an account profile with matching identifying information for the user identifier, the account management system 114 searches user account records to find the account profile with the matching identifying information for the user identifier. Upon finding the account profile, the account management system 114 sends a confirmation communication to the document signature system 104 that an existing account profile matches the user identifier. The document signature system 104 receives the confirmation communication verifying that the account management system 114 has a user account corresponding with the user identifier associated with the digital document.

In some implementations, the document signature system 104 sends 320 the digital document and/or the document interaction data to the account management system 114. For example, upon determining that the digital document corresponds to the digital document template, and upon determining that the account management system 114 has a user account corresponding with the user identifier associated with the digital document, the document signature system 104 sends at least one of the digital document or the document interaction data. In some embodiments, the document signature system 104 sends a copy of the signed document to the account management system 114. In some embodiments, the document signature system 104 sends document interaction data such as a signature status for the digital document, an opened status for the digital document, a viewed status for the digital document, and/or status progress indicators indicating user interaction events with the digital document.

FIG. 3C illustrates a series of acts in the workflow as an alternative to some of the acts shown in FIG. 3B. For example, in some embodiments, following the act 314 of determining whether the digital document corresponds to the digital document template, the document signature system 104 receives 322 a status request from the account management system 114. For instance, the account management system 114 sends a document status request to the document signature system 104 in the form of a query whether the digital document has been signed by the user client device(s) 110. The document status request can include additional queries, such as whether the user client device(s) 110 has opened the digital document and/or whether the user client device(s) 110 has contested all or a portion of the digital document.

In some embodiments, the document signature system 104 sends 324 the digital document and/or the document interaction data to the account management system 114. For example, the document signature system 104 sends the signed digital document in response to the document status request from the account management system 114. In some embodiments, the act 324 of sending the digital document and/or the document interaction data is the same as the act 320 described above in connection with FIG. 3B.

The acts of the workflows depicted in FIGS. 3A-3C are presented in the displayed order merely for illustrative purposes. In some embodiments, some of the acts depicted in FIGS. 3A-3C can be arranged in different orders, repeated, or omitted, without departing from the principles taught in the present disclosure.

Figure 4A:
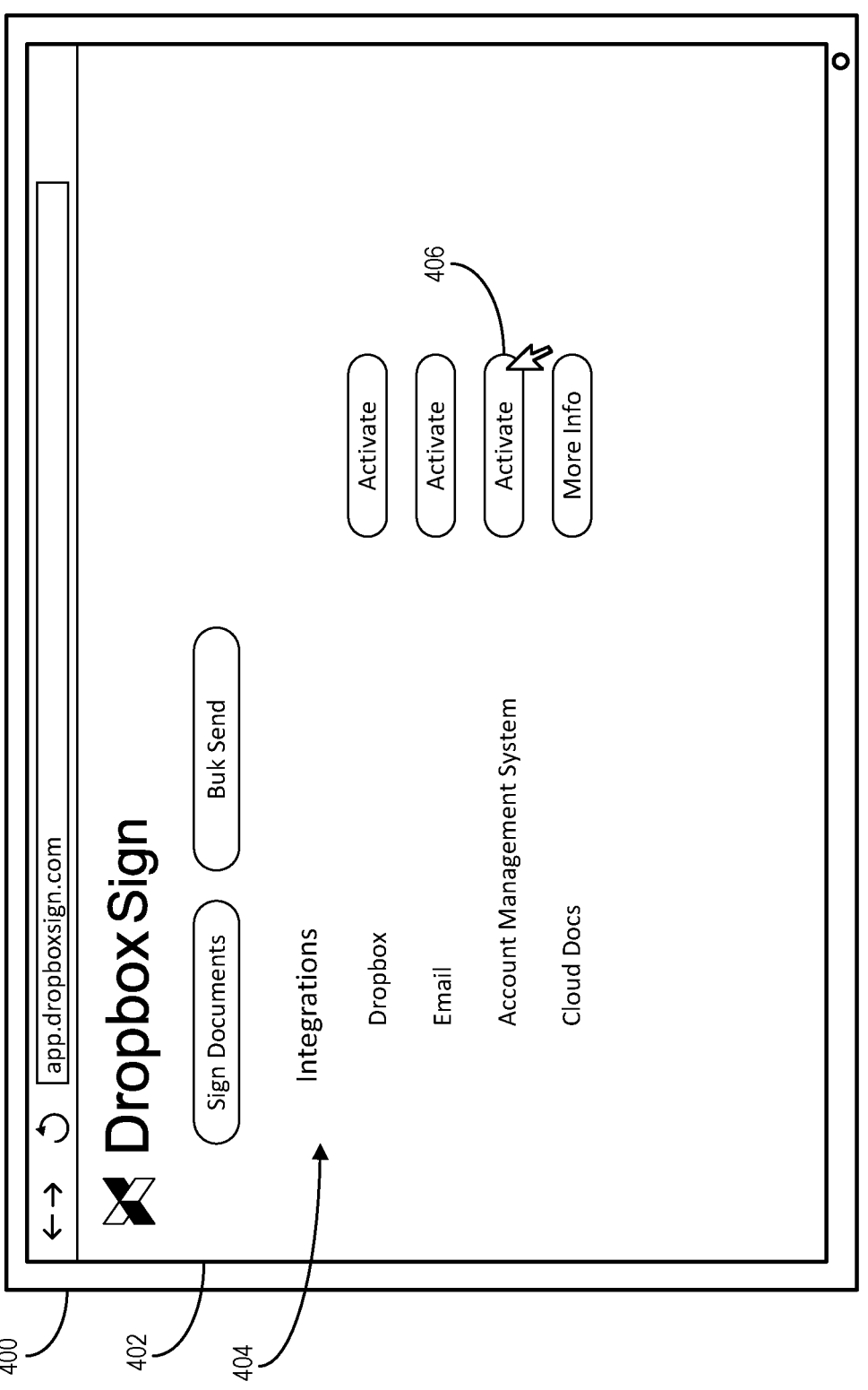
FIGS. 4A-4B illustrate a computing device providing a graphical user interface for receiving an indication to activate one or more digital document templates for integration with an account management system in accordance with one or more embodiments.
Figure 4B:
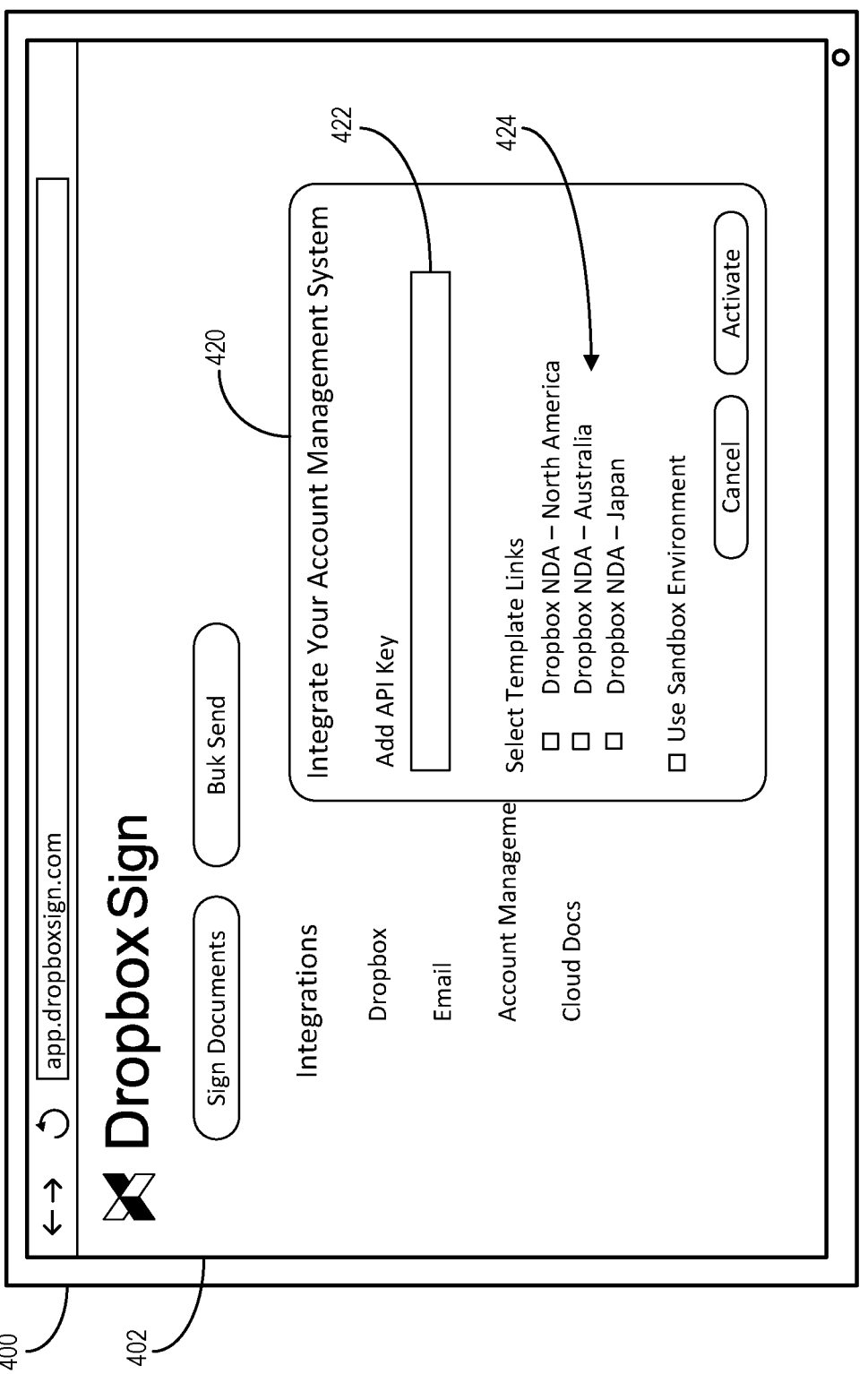

As discussed above, the document signature system 104 can integrate with the account management system 114. For instance, FIGS. 4A-4B illustrate a graphical user interface of the document signature system 104 activating an account integration between the document signature system 104 and the account management system 114 in accordance with one or more embodiments. Specifically, FIG. 4A shows the document signature system 104 providing a graphical user interface 402 for display via a computing device 400 (e.g., the administrator client device(s) 108). Within the graphical user interface 402, the document signature system 104 shows a list 404 of systems or applications with which the document signature system 104 can integrate. For example, the document signature system 104 includes in the list 404 the name of the account management system 114. The document signature system 104 provides user selection elements (e.g., buttons, on/off switches, toggle switches) to activate integration with one or more of the listed systems or applications. For example, the document signature system 104 provides user selection element 406 to activate integration with the account management system 114. FIG. 4A illustrates a cursor hovering over user selection element 406.

Upon selection of the user selection element 406, the document signature system 104 can provide an option for an administrator (e.g., a recruiter, a talent coordinator) to activate the integration with the account management system 114. For example, as illustrated in FIG. 4B, in some embodiments, the document signature system 104 provides a window 420 with an authorization key entry element 422 (e.g., a text entry window for inputting an API key).

In some embodiments, the document signature system 104 displays available digital document templates as a list of digital document template links 424. The document signature system 104 can provide an option for an administrator to select one or more digital document template links. Before, during, or after activation of the integration with the account management system 114, the document signature system 104 can retrieve the selected digital document templates and upload them to the document signature system application 120 on the administrator client device(s) 108. In some embodiments, the document signature system 104 can provide a preview of a digital document template within the graphical user interface 402.

In some implementations, the document signature system 104 provides a selection option for the administrator to activate integration with the account management system 114 in a sandbox environment. To illustrate, the document signature system 104 includes an option to integrate with a sandbox environment of the account management system 114 to test the selection of the digital document templates and the activation of the integration.

In some embodiments, the document signature system 104 allows the administrator client device(s) 108 to configure other options at the API key integration stage, such as whether the document signature system 104 reports client device interaction events to the administrator client device(s) 108. For example, the document signature system 104 can send a notification to the administrator client device(s) 108 that a user profile has opened, scrolled, signed, and/or closed a digital document.

With an API key entered into the authorization key entry element 422, and one or more digital document template links selected, the administrator client device(s) 108 can select an activation element, at which point the document signature system 104 activates integration with the account management system 114.

In some embodiments, the document signature system 104 generates a signature profile for a recipient email address corresponding to the digital document template within the account management system. For example, the document signature system 104 generates the signature profile for the recipient email address based on the indication to activate the digital document template.

Furthermore, in some embodiments, the document signature system 104 verifies that the one or more client device interactions correspond to the signature profile for the recipient email address corresponding to the digital document template. For example, the document signature system 104 makes this verification based on receiving the one or more client device interactions associated with the recipient email address via the document signature system.

Additionally, in some embodiments, the document signature system 104 updates a status of the signature profile within the account management system to reflect the one or more client device interactions. For instance, the document signature system 104 updates the status of the signature profile in response to verifying the one or more client device interactions.

In some implementations, the document signature system 104 provides the user client device(s) 110 with an option to lodge objections to some or all of a digital document. For example, the document signature system 104 provides an open-ended comment box in which a user can state objections or ask for modifications to terms of the digital document. In some embodiments, the document signature system

104 offers the user client device(s) 110 an option to request a negotiation session in which the user the administrator can ask for an altered version of the digital document with varied terms. In some embodiments, the document signature system 104 provides a digital document that allows a user client device(s) 110 to accept (i.e., sign) a portion of a digital document, while leaving the remainder of the digital document unsigned.

Figure 5:
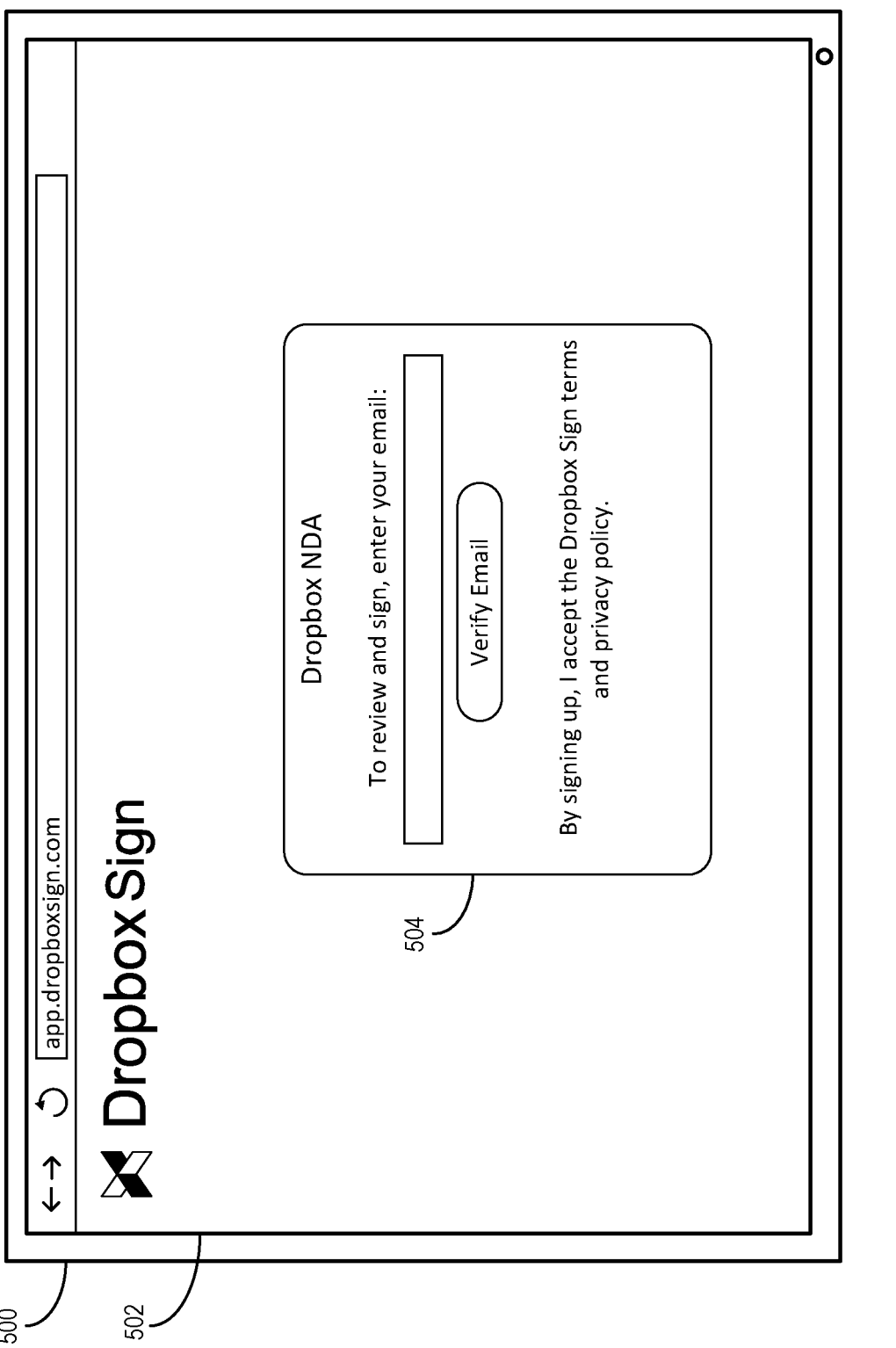
FIG. 5 illustrates a computing device providing a graphical user interface for authenticating an email address in accordance with one or more embodiments.

As discussed above, the document signature system 104 can authenticate information associated with a user profile. For instance, FIG. 5 illustrates a graphical user interface of the document signature system 104 authenticating an email address associated with the user profile in accordance with one or more embodiments. Specifically, FIG. 5 shows the document signature system 104 providing a graphical user interface 502 for display via a computing device 500 (e.g., the user client device(s) 110). Within the graphical user interface 502, the document signature system 104 provides a window 504 through which the user client device(s) 110 can enter and submit an email address for verification. The document signature system 104 then receives the email address and sends a verification link to the email address. Upon receipt of the link sent by the document signature system 104, the user client device(s) 110 can select the link to transmit verification to the document signature system 104. The document signature system 104 receives the verification from the user client device(s) 110 and authenticates the email address. In some embodiments, with the email address authenticated, the document signature system 104 sends one or more digital documents to the email address for review and signature.

Figure 6A:
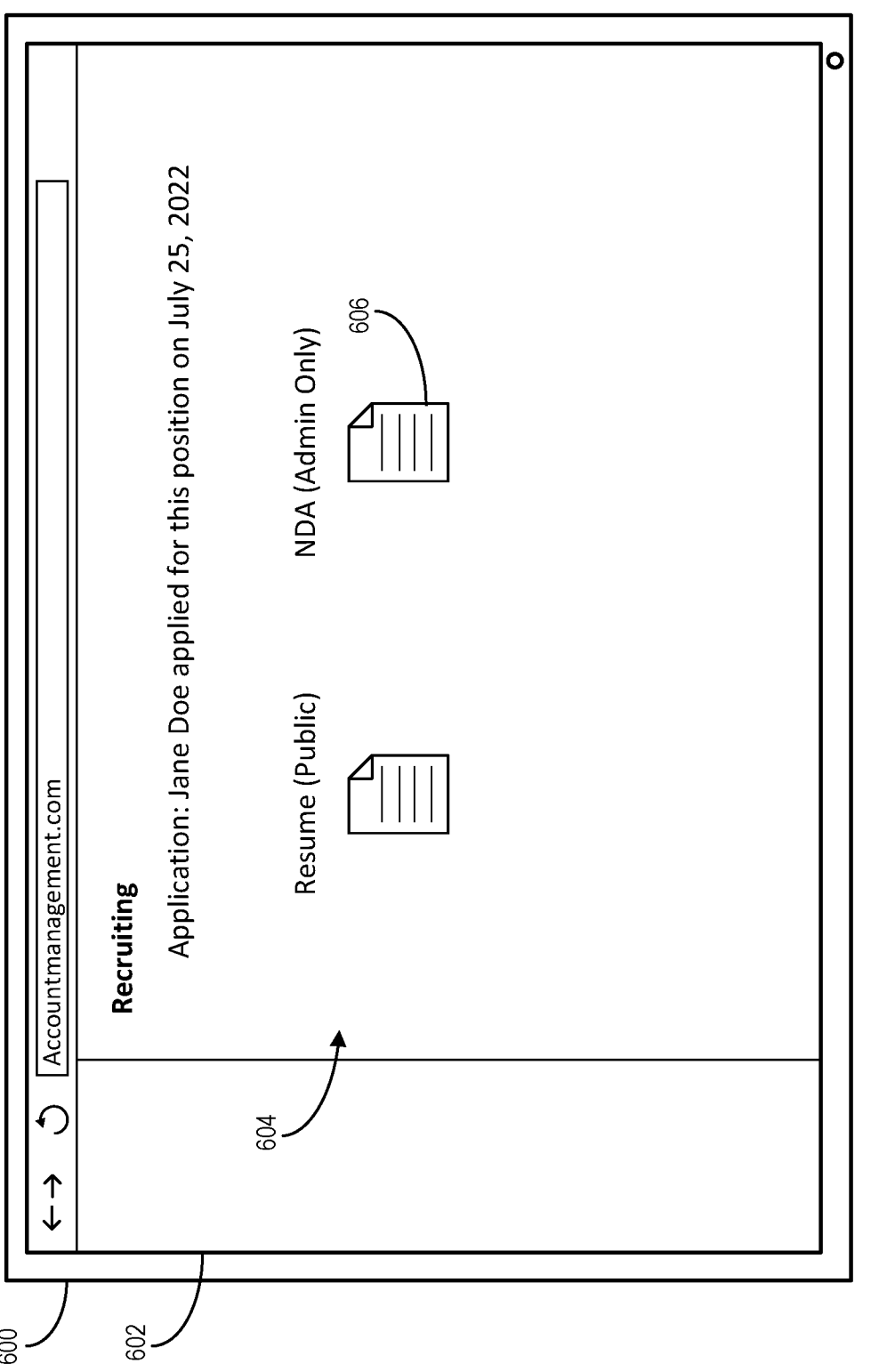
FIGS. 6A-6B illustrate a computing device providing a graphical user interface for receiving and displaying a digital document in accordance with one or more embodiments.
Figure 6B:
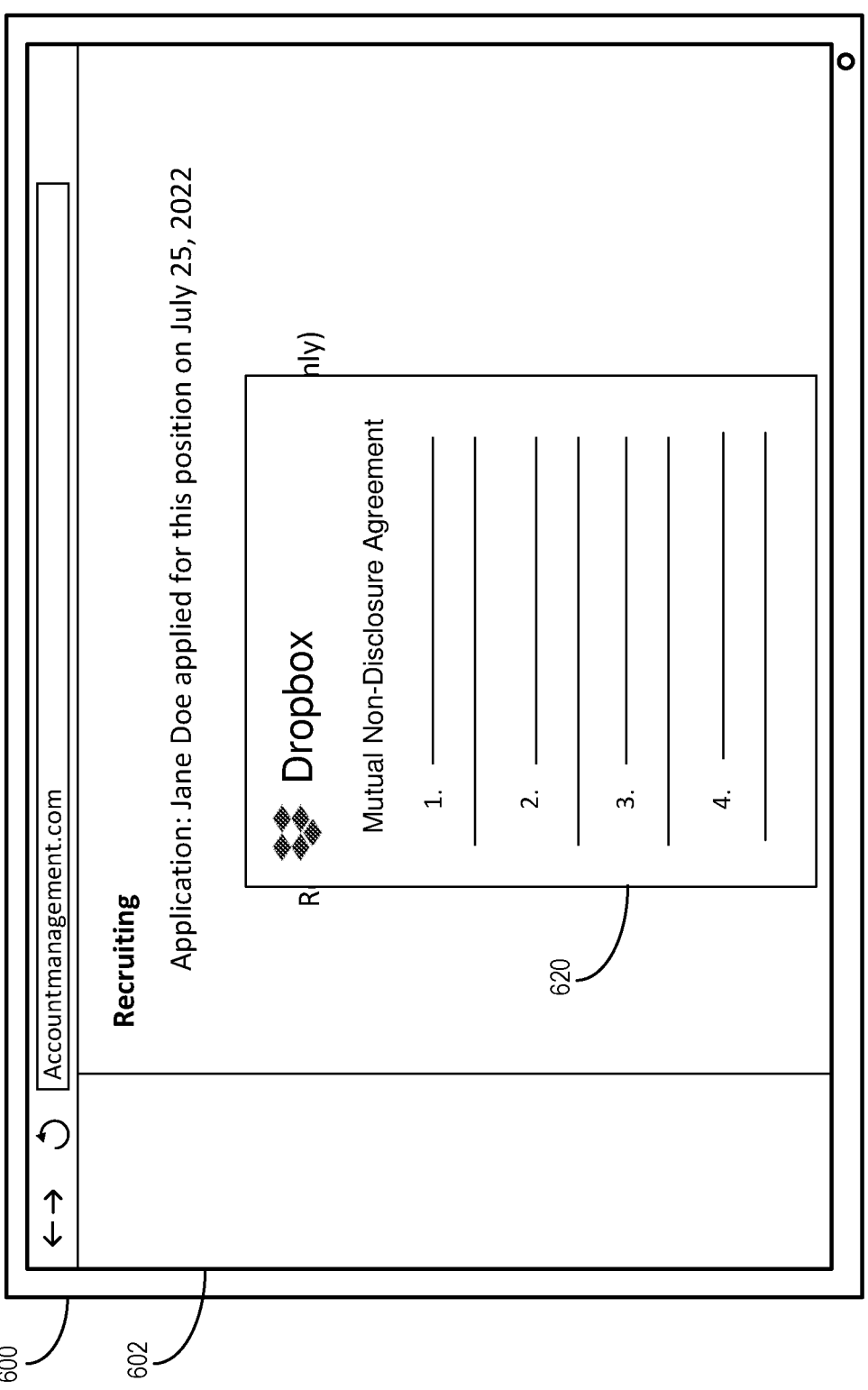

As discussed above, the document signature system 104 can send the digital document to the account management system 114. For instance, FIGS. 6A-6B illustrate a graphical user interface of the account management system 114 receiving and displaying the digital document in accordance with one or more embodiments. Specifically, FIG. 6A shows the account management system 114 providing a graphical user interface 602 for display via a computing device 600 (e.g., the administrator client device(s) 108). Within the graphical user interface 602, the account management system 114 can display user identifier information 604 associated with the user account. For example, the account management system 114 displays a link 606 (e.g., an icon, a viewable or downloadable file) to the digital document received from the document signature system 104. Alternatively, or additionally, the account management system 114 displays document interaction data received from the document signature system 104. Stated otherwise, the document signature system 104 can transmit the digital document and/or the document interaction data for display via the administrator client device(s) 108. In some embodiments, the document signature system 104 directly displays the digital document and/or the document interaction data via the administrator client device(s) 108 (e.g., instead of the account management system 114 providing this information for display).

In some embodiments, the document signature system 104 or the account management system 114 provides a display of a preview of the digital document. For example, FIG. 6B illustrates the account management system 114 providing a preview 620 of the digital document within the graphical user interface 602. The account management system 114 renders the preview 620 of the digital document within the graphical user interface 602 upon selection of the link 606 to the digital document. As mentioned, in some embodiments, the document signature system 104 provides the digital document for display directly (e.g., instead of the account management system 114). Thus, the document signature system 104 can render the preview 620 of the digital document within a graphical user interface on the administrator client device(s) 108.

In some embodiments, the document signature system 104 can detect violations of terms of a signed digital document. For example, the document signature system 104 scans user activity on the Internet associated with a user profile to determine whether the activity contravenes requirements imposed by a signed non-disclosure agreement. The document signature system 104 can report the detected violations to the account management system 114 and/or the administrator client device(s) 108.

In some implementations, the document signature system 104 uploads the signed document to the content management system 102 in addition to the account management system 114.

FIGS. 1-6B, the corresponding text, and the examples provide a number of different methods, systems, devices, and non-transitory computer-readable media of the document signature system 104. In addition to the foregoing, one or more embodiments can also be described in terms of flowcharts comprising acts for accomplishing a particular result, as shown in FIG. 7. FIG. 7 may be performed with more or fewer acts. Further, the acts may be performed in differing orders. Additionally, the acts described herein may be repeated or performed in parallel with one another or parallel with different instances of the same or similar acts.

As mentioned, FIG. 7 illustrates a flowchart of a series of acts 700 for integrating a document signature system with an account management system in accordance with one or more embodiments. While FIG. 7 illustrates acts according to one embodiment, alternative embodiments may omit, add to, reorder, and/or modify any of the acts shown in FIG. 7. The acts of FIG. 7 can be performed as part of a method. Alternatively, a non-transitory computer-readable medium can comprise instructions that, when executed by one or more processors, cause a computing device to perform the acts of FIG. 7. In some embodiments, a system can perform the acts of FIG. 7.

As shown in FIG. 7, the series of acts 700 includes an act 710 for receiving an indication to activate a digital document template for integration with an account management system. In particular, the act 710 can include receiving, via a cloud-based document signature system, an indication to activate a digital document template for integration with an account management system. Furthermore, the series of acts 700 includes an act 720 for receiving one or more client device interactions with a digital document. In particular, the act 720 can include receiving, by the cloud-based document signature system, one or more client device interactions with a digital document managed by the cloud-based document signature system. Additionally, the series of acts 700 includes an act 730 for determining whether the digital document corresponds to the digital document template. Also, the series of acts 700 includes an act 740 for communicating with the account management system to determine whether the account management system comprises a user account corresponding with a user identifier associated with the digital document. In particular, the act 740 can include communicating, by the cloud-based document signature system and with the account management system, to determine whether the account management system comprises a user account corresponding with a user identifier associated with the digital document. Moreover, the series of acts 700 includes an act 750 for sending at least one of: the digital document or document interaction data representing at least some of the client device interactions with the digital document. In particular, the act 750 can include based on a determination that the digital document corresponds to the digital document template and that the account management system comprises the user account corresponding with the user identifier associated with the digital document, sending, by the cloud-based document signature system to the account management system, at least one of: the digital document or document interaction data representing at least one of the one or more client device interactions with the digital document.

In some embodiments, the series of acts 700 includes generating, based on the indication to activate the digital document template, a signature profile for a recipient email address corresponding to the digital document template within the account management system. Also, in some embodiments, the series of acts 700 includes verifying, based on receiving one or more client device interactions associated with the recipient email address via the cloud-based document signature system, that the one or more client device interactions correspond to the signature profile for the recipient email address corresponding to the digital document template. Moreover, in some embodiments, the series of acts 700 includes updating, in response to verifying the one or more client device interactions, a status of the signature profile within the account management system to reflect the one or more client device interactions.

In some embodiments, the series of acts 700 includes providing, by the document signature system, a notification to the account management system, the notification indicating that the user account has opened the digital document. Additionally, in some embodiments, the series of acts 700 includes providing, by the document signature system, a notification to the account management system, the notification indicating that the digital document is unsigned.

In some embodiments, the series of acts 700 includes determining that the digital document is unsigned; and sending, via the cloud-based document signature system, an event prevention communication to the account management system indicating that a communication event should be blocked.

In some embodiments, the series of acts 700 includes providing, to the account management system, document interaction data indicating a signature completion status of a distributed document. Moreover, in some embodiments, the series of acts 700 includes providing a notification to the account management system, the notification indicating a signature completion status of a distributed document. Further, in some embodiments, the series of acts 700 includes indicating a signature completion status of a distributed document. Also, in some embodiments, the series of acts 700 includes communicating, by the cloud-based document signature system, with the account management system to determine whether the account management system comprises a second user account corresponding with a second user identifier associated with the digital document.

In some embodiments, the series of acts 700 includes determining whether the digital document is signed. In some embodiments, the series of acts 700 includes based on a determination that the digital document corresponds to the digital document template, sending, to the account management system, at least one of: the digital document or document interaction data indicating a signature status of the digital document. In some embodiments, the series of acts 700 includes wherein the document interaction data further indicates an opened status for the digital document.

In some embodiments, the series of acts 700 includes determining that the document interaction data comprises an unsigned status for the digital document; and sending a notification indicating the unsigned status of the digital document. Moreover, in some embodiments, the series of acts 700 includes determining that the digital document is unsigned; and sending, to the account management system, an event prevention communication that prevents a progression of a workflow associated with a user account.

In some embodiments, the series of acts 700 includes receiving an indication to activate a digital document template for integration with an account management system; receiving one or more client device interactions with a digital document managed by a document signature system; determining whether the digital document corresponds to the digital document template; and based on a determination that the digital document corresponds to the digital document template, sending, to the account management system, at least one of: the digital document or document interaction data representing at least one of the one or more client device interactions with the digital document.

Embodiments of the present disclosure may comprise or utilize a special purpose or general purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or generators and/or other electronic devices. When information is transferred, or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface generator (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. In one or more embodiments, computer-executable instructions are executed on a general purpose computer to turn the general purpose computer into a special purpose computer implementing elements of the disclosure. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program generators may be located in both local and remote memory storage devices.

Embodiments of the present disclosure can also be implemented in cloud computing environments. In this description, "cloud computing" is defined as a subscription model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing subscription model can be composed of various characteristics such as, for example, on-demand self-service, broad network access, resource pooling, rapid elasticity, measured service, and so forth. A cloud-computing subscription model can also expose various service subscription models, such as, for example, Software as a Service ("SaaS"), a web service, Platform as a Service ("PaaS"), and Infrastructure as a Service ("IaaS"). A cloud-computing subscription model can also be deployed using different deployment subscription models such as private cloud, community cloud, public cloud, hybrid cloud, and so forth. In this description and in the claims, a "cloud-computing environment" is an environment in which cloud computing is employed.

Figure 8:
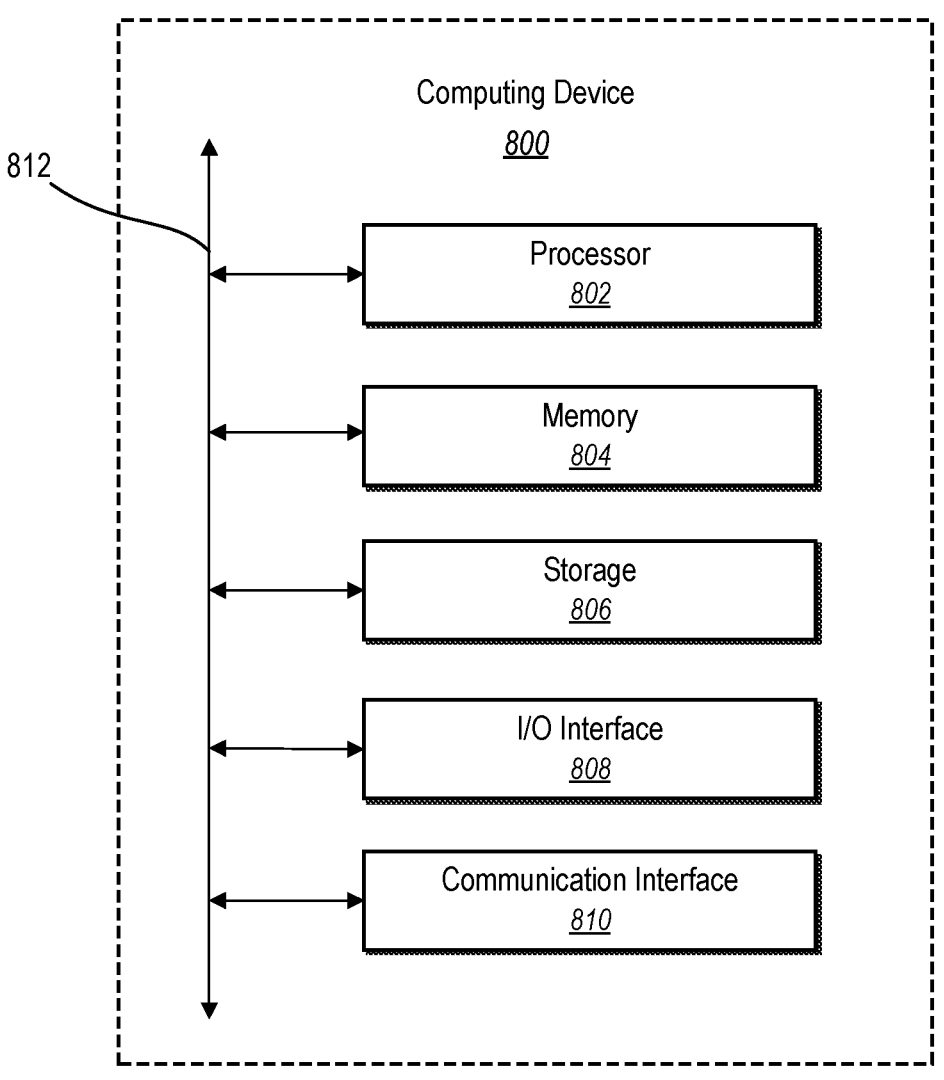
FIG. 8 illustrates a block diagram of an example computing device for implementing one or more embodiments of the present disclosure.

FIG. 8 illustrates a block diagram of an example computing device 800 that may be configured to perform one or more of the processes described above. One will appreciate that one or more computing devices, such as the computing device 800 may represent the computing devices described above (e.g., server device(s) 106, server device(s) 116, administrator client device(s) 108, or user client device(s) 110). In one or more embodiments, the computing device 800 may be a mobile device (e.g., a mobile telephone, a smartphone, a PDA, a tablet, a laptop, a camera, a tracker, a watch, a wearable device, etc.). In some embodiments, the computing device 800 may be a non-mobile device (e.g., a desktop computer or another type of client device). Further, the computing device 800 may be a server device that includes cloud-based processing and storage capabilities.

As shown in FIG. 8, the computing device 800 can include one or more processor(s) 802, memory 804, a storage device 806, input/output interfaces 808 (or "I/O interfaces 808"), and a communication interface 810, which may be communicatively coupled by way of a communication infrastructure (e.g., bus 812). While the computing device 800 is shown in FIG. 8, the components illustrated in FIG. 8 are not intended to be limiting. Additional or alternative components may be used in other embodiments. Furthermore, in certain embodiments, the computing device 800 includes fewer components than those shown in FIG. 8. Components of the computing device 800 shown in FIG. 8 will now be described in additional detail.

In particular embodiments, the processor(s) 802 includes hardware for executing instructions, such as those making up a computer program. As an example, and not by way of limitation, to execute instructions, the processor(s) 802 may retrieve (or fetch) the instructions from an internal register, an internal cache, memory 804, or a storage device 806 and decode and execute them.

The computing device 800 includes the memory 804, which is coupled to the processor(s) 802. The memory 804 may be used for storing data, metadata, and programs for execution by the processor(s). The memory 804 may include one or more of volatile and non-volatile memories, such as Random-Access Memory ("RAM"), Read-Only Memory ("ROM"), a solid-state disk ("SSD"), Flash, Phase Change Memory ("PCM"), or other types of data storage. The memory 804 may be internal or distributed memory.

The computing device 800 includes the storage device 806 for storing data or instructions. As an example, and not by way of limitation, the storage device 806 can include a non-transitory storage medium described above. The storage device 806 may include a hard disk drive ("HDD"), flash memory, a Universal Serial Bus ("USB") drive or a combination these or other storage devices.

As shown, the computing device 800 includes one or more I/O interfaces 808, which are provided to allow a user to provide input to (such as user strokes), receive output from, and otherwise transfer data to and from the computing device 800. These I/O interfaces 808 may include a mouse, keypad or a keyboard, a touch screen, camera, optical scanner, network interface, modem, other known I/O devices or a combination of such I/O interfaces 808. The touch screen may be activated with a stylus or a finger.

The I/O interfaces 808 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O interfaces 808 are configured to provide graphical data to a display for presentation to a user. The graphical data may be representative of one or more graphical user interfaces and/or any other graphical content as may serve a particular implementation.

The computing device 800 can further include a communication interface 810. The communication interface 810 can include hardware, software, or both. The communication interface 810 provides one or more interfaces for communication (such as, for example, packet-based communication) between the computing device and one or more other computing devices or one or more networks. As an example, and not by way of limitation, communication interface 810 may include a network interface controller ("NIC") or network adapter for communicating with an Ethernet or other wire-based network or a wireless NIC ("WNIC") or wireless adapter for communicating with a wireless network, such as a WI-FI. The computing device 800 can further include the bus 812. The bus 812 can include hardware, software, or both that connects components of computing device 800 to each other.

Each of the components of the document signature system 104 can include software, hardware, or both. For example, the components can include one or more instructions stored on a computer-readable storage medium and executable by processors of one or more computing devices, such as a client device or server device. When executed by the one or more processors, the computer-executable instructions of the document signature system 104 can cause the computing device(s) to perform the methods described herein. Alternatively, the components can include hardware, such as a special purpose processing device to perform a certain function or group of functions. Alternatively, the components of the document signature system 104 can include a combination of computer-executable instructions and hardware.

Furthermore, the components of the document signature system 104 may, for example, be implemented as one or more operating systems, as one or more stand-alone applications, as one or more modules of an application, as one or more plug-ins, as one or more library functions or functions that may be called by other applications, and/or as a cloud-computing model. Thus, the components may be implemented as a stand-alone application, such as a desktop or mobile application. Furthermore, the components may be implemented as one or more web-based applications hosted on a remote server. The components may also be implemented in a suite of mobile device applications or "apps."

Figure 9:
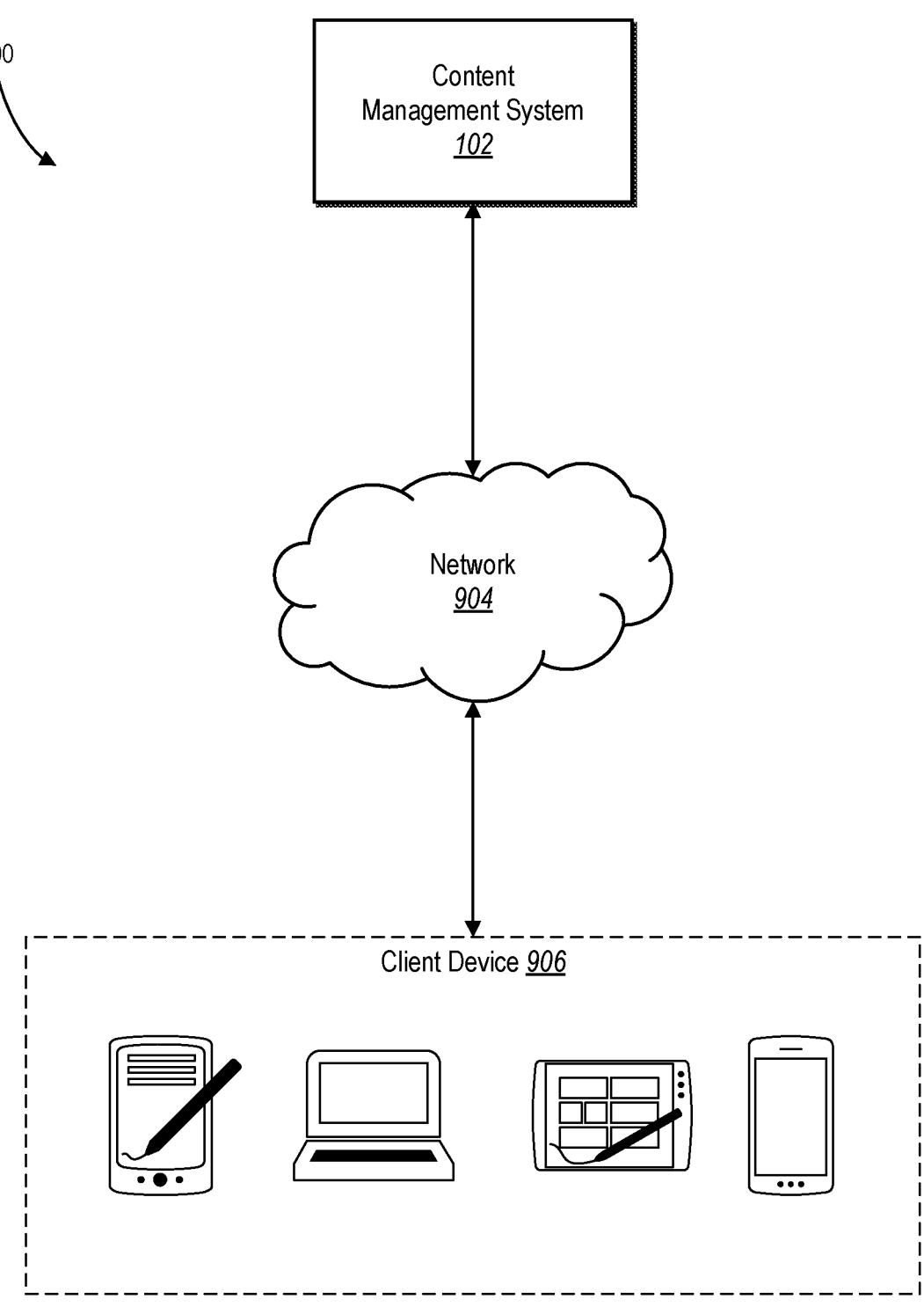
FIG. 9 illustrates a network environment of a content management system in accordance with one or more embodiments.

FIG. 9 is a schematic diagram illustrating a network environment 900 within which one or more embodiments of the content management system 102 can be implemented. For example, as shown in FIG. 9, the content management system 102 may generate, store, manage, receive, and send digital content (such as digital documents and other content items). For example, the content management system 102 may send and receive digital content to and from the client device 906 by way of a network 904. In particular, the content management system 102 can store and manage a collection of digital content. The content management system 102 can manage the sharing of digital content between computing devices associated with a plurality of users. For instance, the content management system 102 can facilitate a user sharing digital content with another user of the content management system 102.

In particular, the content management system 102 can manage synchronizing digital content across multiple client devices associated with one or more users. For example, a user may edit digital content using the client device 906. The content management system 102 can cause the client device 906 to send the edited digital content to the content management system 102. The content management system 102 then synchronizes the edited digital content on one or more additional computing devices.

In addition to synchronizing digital content across multiple devices, one or more embodiments of the content management system 102 can provide an efficient storage option for users that have large collections of digital content. For example, the content management system 102 can store a collection of digital content on the content management system 102, while the client device 906 only stores reduced-sized versions of the digital content. A user can navigate and browse the reduced-sized versions (e.g., a thumbnail of a digital image) of the digital content on the client device 906. In particular, one way in which a user can experience digital content is to browse the reduced-sized versions of the digital content on the client device 906.

Another way in which a user can experience digital content is to select a reduced-size version of digital content to request the full- or high-resolution version of digital content from the content management system 102. In particular, upon a user selecting a reduced-sized version of digital content, the client device 906 sends a request to the content management system 102 requesting the digital content associated with the reduced-sized version of the digital content. The content management system 102 can respond to the request by sending the digital content to the client device 906. The client device 906, upon receiving the digital content, can then present the digital content to the user. In this way, a user can have access to large collections of digital content while minimizing the number of resources used on the client device 906.

The client device 906 may be a desktop computer, a laptop computer, a tablet computer, a personal digital assistant (PDA), an in- or out-of-car navigation system, a smart TV, a virtual reality (VR) or augmented reality (AR) device, a handheld device, a wearable device, a smartphone or other cellular or mobile phone, or a mobile gaming device, another mobile device, or other suitable computing devices. The client device 906 may execute one or more client applications, such as a web browser (e.g., Microsoft Windows Internet Explorer, Mozilla Firefox, Apple Safari, Google Chrome, Opera, etc.) or a native or special-purpose client application (e.g., Facebook for iPhone or iPad, Facebook for Android, etc.), to access and view content over the network 904.

The network 904 may represent a network or collection of networks (such as the Internet, a corporate intranet, a virtual private network (VPN), a local area network (LAN), a wireless local area network (WLAN), a cellular network, a wide area network (WAN), a metropolitan area network (MAN), or a combination of two or more such networks) over which the client device 906 may access the content management system 102.

In the foregoing specification, the invention has been described with reference to specific exemplary embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with fewer or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A computer-implemented method comprising:
   receiving, via a document signature system, an indication to activate a digital document template for integration with an account management system;
   requesting an application programming interface key to integrate the digital document template with the account management system;
   receiving, by the document signature system, one or more client device interactions with a digital document managed by the document signature system;
   determining whether the digital document corresponds to the digital document template;
   generating, based on the one or more client device interactions with the digital document received from the document signature system, a signature profile for a recipient email address corresponding to the digital document template within the account management system;
   communicating, by the document signature system and with the account management system using the application programming interface key, to determine whether the account management system comprises a user account corresponding with a user identifier associated with the digital document; and
   based on a determination that the digital document corresponds to the digital document template and that the account management system comprises the user account corresponding with the user identifier associated with the digital document, sending, by the document signature system to the account management system, document interaction data indicating a signature completion status of the digital document.

2. The computer-implemented method of claim 1, further comprising generating the signature profile for the recipient email address corresponding to the digital document template within the account management system based on the indication to activate the digital document template.

3. The computer-implemented method of claim 2, further comprising verifying, based on receiving one or more client device interactions associated with the recipient email address via the document signature system, that the one or more client device interactions correspond to the signature profile for the recipient email address corresponding to the digital document template.

4. The computer-implemented method of claim 3, further comprising updating, in response to verifying the one or more client device interactions, a status of the signature profile within the account management system to reflect the one or more client device interactions.

5. The computer-implemented method of claim 1, further comprising providing, by the document signature system, a notification to the account management system, the notification indicating that the user account has opened the digital document.

6. The computer-implemented method of claim 1, further comprising providing, by the document signature system, a notification to the account management system, the notification indicating that the digital document is unsigned.

7. The computer-implemented method of claim 1, further comprising:
   determining that the digital document is unsigned; and
   sending, via the document signature system, an event prevention communication to the account management system indicating that a communication event should be blocked.

8. The computer-implemented method of claim 1, further comprising providing, to the account management system, the digital document.

9. The computer-implemented method of claim 1, further comprising communicating, by the document signature system, with the account management system to determine whether the account management system comprises a second user account corresponding with a second user identifier associated with the digital document.

10. A non-transitory computer-readable storage medium comprising instructions that, when executed by at least one processor, cause a cloud-based document signature system to:
   receive an indication to activate a digital document template for integration with an account management system;
   request an application programming interface key to integrate the digital document template with the account management system;
   receive one or more client device interactions with a digital document managed by the cloud-based document signature system;
   determine that the digital document corresponds to the digital document template;
   generate, based on the one or more client device interactions with the digital document managed by the cloud-based document signature system, a signature profile for a recipient email address corresponding to the digital document template within the account management system;
   determine whether the digital document is signed; and
   based on a determination that the digital document corresponds to the digital document template, send, to the account management system using the application programming interface key, document interaction data indicating a signature completion status of the digital document.

11. The non-transitory computer-readable storage medium of claim 10, wherein the document interaction data further indicates an opened status for the digital document.

12. The non-transitory computer-readable storage medium of claim 10, further comprising instructions that, when executed by the at least one processor, cause the cloud-based document signature system to:
   determine that the document interaction data comprises an unsigned status for the digital document; and
   send a notification indicating the unsigned status of the digital document.

13. The non-transitory computer-readable storage medium of claim 10, further comprising instructions that, when executed by the at least one processor, cause the cloud-based document signature system to:
   determine that the digital document is unsigned; and
   send, to the account management system, an event prevention communication that prevents a progression of a workflow associated with a user account.

14. The non-transitory computer-readable storage medium of claim 10, further comprising instructions that, when executed by the at least one processor, cause the cloud-based document signature system to provide a notification to the account management system, the notification indicating a signature completion status of a distributed document.

15. A system comprising:
   at least one processor; and
   at least one non-transitory computer-readable storage medium comprising instructions that, when executed by the at least one processor, cause the system to:
   receive an indication to activate a digital document template for integration with an account management system;
   request an application programming interface key to integrate the digital document template with the account management system;
   receive one or more client device interactions with a digital document managed by a document signature system;
   determine whether the digital document corresponds to the digital document template;
   generate, based on the one or more client device interactions with the digital document managed by the document signature system, a signature profile for a recipient email address corresponding to the digital document template within the account management system; and
   based on a determination that the digital document corresponds to the digital document template, send, to the account management system using the application programming interface key, document interaction data indicating a signature completion status of the digital document.

16. The system of claim 15, further comprising instructions that, when executed by the at least one processor, cause the system to generate the signature profile for the recipient email address corresponding to the digital document template within the account management system based on the indication to activate the digital document template.

17. The system of claim 16, further comprising instructions that, when executed by the at least one processor, cause the system to verify, based on receiving one or more client device interactions associated with the recipient email address via the document signature system, that the one or more client device interactions correspond to the signature profile for the recipient email address corresponding to the digital document template.

18. The system of claim 17, further comprising instructions that, when executed by the at least one processor, cause the system to update, in response to verifying the one or more client device interactions, a status of the signature profile within the account management system to reflect the one or more client device interactions.

19. The system of claim 15, further comprising instructions that, when executed by the at least one processor, cause the system to provide, to the account management system, the digital document.

20. The system of claim 19, further comprising instructions that, when executed by the at least one processor, cause the system to communicate, by the document signature system, with the account management system to determine whether the account management system comprises a second user account corresponding with a second user identifier associated with the digital document.

\* \* \* \* \*